(12) United States Patent
Galvan

(10) Patent No.: US 8,244,565 B2
(45) Date of Patent: Aug. 14, 2012

(54) INDIVIDUAL PRODUCTIVITY AND UTILIZATION TRACKING TOOL

(75) Inventor: Mark Allan Galvan, Woodbridge, VA (US)

(73) Assignee: Accenture Global Services Limited, Dublin (IE)

( * ) Notice: Subject to any disclaimer, the term of this patent is extended or adjusted under 35 U.S.C. 154(b) by 530 days.

(21) Appl. No.: 12/454,208

(22) Filed: May 13, 2009

(65) Prior Publication Data

US 2010/0023385 A1    Jan. 28, 2010

Related U.S. Application Data

(60) Provisional application No. 61/127,583, filed on May 14, 2008.

(51) Int. Cl.
*G06Q 40/00* (2012.01)
(52) U.S. Cl. ..................... 705/7.11; 705/7.38
(58) Field of Classification Search .............. 705/11, 705/7.11, 7.38
See application file for complete search history.

(56) References Cited

U.S. PATENT DOCUMENTS

| | | | |
|---|---|---|---|
| 7,650,347 B2 * | 1/2010 | Mankovski et al. | 705/7.15 |
| 2003/0115094 A1 * | 6/2003 | Ammerman et al. | 705/11 |
| 2004/0138940 A1 | 7/2004 | Aybar et al. | |
| 2004/0204984 A1 * | 10/2004 | Yeh et al. | 705/11 |
| 2005/0131747 A1 | 6/2005 | Vigil | |
| 2006/0010001 A1 * | 1/2006 | Hamelink | 705/1 |
| 2006/0090160 A1 * | 4/2006 | Forsythe et al. | 718/100 |
| 2007/0225942 A1 | 9/2007 | Smith et al. | |
| 2008/0086290 A1 * | 4/2008 | Wilson | 703/6 |
| 2010/0023385 A1 * | 1/2010 | Galvan | 705/11 |

OTHER PUBLICATIONS

Examiner's first report issued in Australian Patent Application No. 2010201888 dated Jan. 10, 2011.
Examiner's first report issued in Australian Patent Application No. 2009251163 dated Jul. 4, 2011.

* cited by examiner

*Primary Examiner* — Thomas Dixon
*Assistant Examiner* — Benjamin S Fields
(74) *Attorney, Agent, or Firm* — Brinks Hofer Gilson & Lione

(57) ABSTRACT

A method of tracking productivity and utilization information regarding an individual of an organization. The method including entering via an input device information regarding the individual into a database that: 1) identifies each direct task worked on by the individual during a session of work, 2) direct time applied to each of the identified direct tasks during the session of work, and 3) a number of units processed or completed for each of the identified direct tasks corresponding to each of the applied direct times. The method further including displaying on a display information regarding productivity and utilization for the individual based on the direct tasks, the direct times and the number of units that are present in the database.

33 Claims, 45 Drawing Sheets

Fig. 3 accenture  Productivity and Utilization Tracking Tool for
Today is:    May 12, 2008

Client Funded Direct      19
Client Funded Indirect    3.5
Non Colient Funded        5

| HOURS TOWARD KEY INITIATIVES | |
|---|---|
| Training: | 1.5 |
| Continuous Improvement: | 1 |

MTD Utilization  82%

Click Here for Help

PUTT V 4.1
Patent Pending

| Date | Reg Hours | OT Hours | Task Description | Client-Contract | Qty PROC | Qty COMP | Use the Qty PROC or Qty COMP to record the quantity you worked on | % of Target | CCV SCV | Comment or Cause of Productivity Variation | Total Daily Hours | Daily Util Rate |
|---|---|---|---|---|---|---|---|---|---|---|---|---|
| 05/01/08 | 2.50 | 0.00 | Recruit-Job descriptions created/updated | LS and CO | | 7 | < Use PROC if worked or COMP if completed | | | systems slow | | |
| 05/01/08 | 2.00 | 0.00 | Recruit-Recruitment advertising and marketing services provide | LS and CO | | 2 | < Use PROC if worked or COMP if completed | | | | | |
| 05/01/08 | 1.50 | 0.00 | Recruit-Vendors managed | LS and CO | | 2 | < Use PROC if worked or COMP if completed | | | | | |
| 05/01/08 | 1.00 | 0.00 | Recruit-Workforce planning services provided | LS and CO | | 1 | < Use PROC if worked or COMP if completed | | | | | |
| 05/01/08 | 0.00 | 0.00 | Select Direct Task | LS and CO | | | | | | | | |
| 05/01/08 | 0.00 | 0.00 | Select Direct Task | LS and CO | | | | | | | | |
| 05/01/08 | 0.00 | 0.00 | Select Direct Task | LS and CO | | | | | | | | |
| 05/01/08 | 0.00 | 0.00 | Select Direct Task | LS and CO | | | | | | | | |
| 05/01/08 | 0.50 | 0.00 | Select Indirect Task | LS and CO | | | | | | | | |
| 05/01/08 | 0.50 | 0.00 | Client – Team Member Recruitment | LS and CO | | | | | | | | |
| 05/01/08 | 0.00 | 0.00 | Select Indirect Task | LS and CO | | | | | | | | |
| 05/01/08 | 0.00 | 0.00 | Select Indirect Task | LS and CO | | | | | | | | |
| 05/01/08 | 0.00 | 0.00 | Select Indirect Task | LS and CO | | | | | | | | |
| 05/01/08 | 0.00 | 0.00 | Select Indirect Task | LS and CO | | | | | | | | |
| | | | | | | | | | | | 8.00 | 1.00 |

Data Worksheet    Process LUT    Task Look ID

Frequent Recurring Indirect Tasks

| INDIRECT TASK | DESCRIPTION FOR PROPER USE |
|---|---|
| Breaks | .25 hours should be added for each 4 hours of paid time |
| CIO Support | If a laptop or other system is unusable, time and effort should be applied to another productive task |
| Contractor Time Off | Used for non-paid days off by sub-contractor workforce only |
| Meetings, Non-Team | Non-Records team or sub-team level meetings, i.e., Town Halls |
| Meetings, Team | Records team or sub-team level meetings, not one-on-one discussions |
| Metric Reporting | For use as directed by a team lead to track time used to count, track, measure or monitor production, cycles times or other costs |
| One Down | Use for one down conversations, year-end assessments and individual coaching discussions |
| Operational Excellence | For use as directed by a team lead |
| PII Duties - Bay Monitor | Should appear DAILY as a 5 – 15 minute-a-day task reserved for use by PII Bay Monitors only |
| Productivity Tracking | Should appear DAILY as a 5 – 15 minute-a-day task to enter Productivity Tool data |
| PTO | Used for non-paid days off by AHRS employee workforce only |
| System Down | If a laptop or other system is unusable, time and effort should be applied to another productive task |
| Training | Classroom, one-on-one and shadowing all constitute training. Time must be approved by a team lead in advance |
| Workflow, Records, eOPF | Used by a workflow coordinator or someone assigned workflow tasks only |
| Workflow, Records, Mail | Used by a workflow coordinator or someone assigned workflow tasks only |
| Workflow, Records, OPF Acquisition | Used by a workflow coordinator or someone assigned workflow tasks only |
| Workflow, Records, OPF Creation | Used by a workflow coordinator or someone assigned workflow tasks only |
| Workflow, Records, OPF Disposition | Used by a workflow coordinator or someone assigned workflow tasks only |
| Workflow, Records, OPF Mgmt | Used by a workflow coordinator or someone assigned workflow tasks only |
| Workflow, Records, SF 50 Distro | Used by a workflow coordinator or someone assigned workflow tasks only |
| Workflow, Records, Siebel | Used by a workflow coordinator or someone assigned workflow tasks only |
| Workflow, Records, Sort and File | Used by a workflow coordinator or someone assigned workflow tasks only |

| Sub Team Name | Team | Points | Process Category | Service Line |
|---|---|---|---|---|
| Customer Services | Customer Services | | Contact Center | Customer Services |
| Customer Services | Customer Services | | Knowledge Mgmt | Customer Services |
| Customer Services | Customer Services | | Contact Center | Customer Services |
| Customer Services | Customer Services | | Contact Center | Customer Services |
| PAR | PAR | | Employee Data | Data and Records Management |
| PAR | PAR | | Employee Data | Data and Records Management |
| Mail Ops | Records | | Physical Records | Data and Records Management |
| Customer Services | Customer Services | | Contact Center | Customer Services |
| Customer Services | Customer Services | | Employee Data | Data and Records Management |
| Operational Priorities | Special Handling | | Employee Data | Data and Records Management |
| Operational Priorities | Special Handling | | Employee Data | Data and Records Management |
| Operational Priorities | Special Handling | | Employee Data | Data and Records Management |
| Operational Priorities | Special Handling | | Employee Data | Data and Records Management |
| Operational Priorities | Special Handling | | Employee Data | Data and Records Management |
| Operational Priorities | Special Handling | | Employee Data | Data and Records Management |
| Operational Priorities | Special Handling | | Employee Data | Data and Records Management |
| Operational Priorities | Special Handling | | Employee Data | Data and Records Management |
| Operational Priorities | Special Handling | | Employee Data | Data and Records Management |
| Operational Priorities | Special Handling | | Employee Data | Data and Records Management |
| Operational Priorities | Special Handling | | Employee Data | Data and Records Management |
| Special Handling | Special Handling | | Employee Data | Data and Records Management |
| Special Handling | Special Handling | | Employee Data | Data and Records Management |
| Special Handling | Special Handling | | Employee Data | Data and Records Management |
| Special Handling | Special Handling | | Employee Data | Data and Records Management |
| Special Handling | Special Handling | | Employee Data | Data and Records Management |
| Settlements | Special Handling | | Employee Data | Data and Records Management |
| Settlements | Special Handling | | Employee Data | Data and Records Management |
| Settlements | Special Handling | | Employee Data | Data and Records Management |
| Settlements | Special Handling | | Employee Data | Data and Records Management |
| Settlements | Special Handling | | Employee Data | Data and Records Management |
| PAR | Special Handling | | Employee Data | Data and Records Management |
| PAR | Special Handling | | Employee Data | Data and Records Management |
| PAR | Special Handling | | Employee Data | Data and Records Management |
| PAR | Special Handling | | Employee Data | Data and Records Management |
| eOPF Scanning | Records | | Document and Image Mgmt | Data and Records Management |
| eOPF Scanning | Records | | Document and Image Mgmt | Data and Records Management |
| eOPF Scanning | Records | | Document and Image Mgmt | Data and Records Management |
| eOPF Scanning | Records | | Document and Image Mgmt | Data and Records Management |
| eOPF Scanning | Records | | Document and Image Mgmt | Data and Records Management |
| eOPF Scanning | Records | | Document and Image Mgmt | Data and Records Management |
| eOPF Scanning | Records | | Document and Image Mgmt | Data and Records Management |
| eOPF Scanning | Records | | Document and Image Mgmt | Data and Records Management |
| eOPF Scanning | Records | | Document and Image Mgmt | Data and Records Management |
| HOT | HOT | | On-boarding and Orientation | Recruitment |
| HOT | HOT | | On-boarding and Orientation | Recruitment |
| HOT | HOT | | On-boarding and Orientation | Recruitment |
| HOT | HOT | | On-boarding and Orientation | Recruitment |
| HOT | HOT | | On-boarding and Orientation | Recruitment |
| HOT | HOT | | On-boarding and Orientation | Recruitment |

| | | | | |
|---|---|---|---|---|
| HOT - 1.8 Manager on Duty - MOD | Step | Completion Step | < Use COMPLETED Column | Orientation Site Logistics | Job Offer |
| HOT - 1.9 Airport Support | Step | Process Step | < Use PROCESSED Column | Process Job Offer Call | Misc |
| HOT - 3.1 Process New Hire Support Team Inquiries | Step | Process Step | < Use PROCESSED Column | New Hire Support Team | Job Offer |
| HOT - 3.3 New Hire Support Team Inquiries | Step | Completion Step | < Use COMPLETED Column | New Hire Support Team | Job Offer |
| HOT - 6.1 Packet QA | Step | Process Step | < Use PROCESSED Column | Packet QA | Processing |
| HOT - 7.1 Processing ECO Packet | Step | Completion Step | < Use COMPLETED Column | Processing ECO Packet | Processing |
| HOT - 7.3 Post Processing Packet Scrub | Step | Completion Step | < Use COMPLETED Column | Post Processing Packet Scrub | Misc |
| HOT - 8.0 Reporting | Step | Completion Step | < Use COMPLETED Column | Reporting | Misc |
| Record Mgmt - HOT - Case File Mgmt, Destruction | Process | Completion Step | < Use COMPLETED Column | Case File Mgmt, Destruction | Misc |
| Mail Ops - 1.1 Creating SSN Lookup Spreadsheets | Step | Process Step | < Use PROCESSED Column | Stamping Envelopes | Process Mail |
| Mail Ops - 1.2 Create Automated Labels | Step | Process Step | < Use PROCESSED Column | Stamping Envelopes | Process Mail |
| Mail Ops - 1.3 Manual Labels | Step | Process Step | < Use PROCESSED Column | Stamping Envelopes | Process Mail |
| Mail Ops - 1.4 Process UPS/USPS Priority or Express | Sub-Process | Completion Step | < Use COMPLETED Column | Process UPS/USPS Priority or Express | Process Mail |
| Mail Ops - 2.1 Stuffing Envelopes - QA 1 | Sub-Process | Process Step | < Use PROCESSED Column | Stamping Envelopes | Process Mail |
| Mail Ops - 2.2 Stamping Envelopes - QA 2 | Sub-Process | Completion Step | < Use COMPLETED Column | Stamping Envelopes | Process Mail |
| Mail Ops - 2.3 Non-Fill QA | Sub-Process | Completion Step | < Use COMPLETED Column | | Process Mail |
| Mail Ops - 5.1 Process Outbound Fax | Step | Process Step | < Use PROCESSED Column | Process Outbound Fax | Process Fax |
| Mail Ops - 6.1 Sort and Date Stamp Faxes | Sub-Process | Completion Step | < Use COMPLETED Column | Sort and Date Stamp Faxes | Process Mail |
| Mail Ops - 6.2 Open, Sort and Date Stamp Incoming Mail | Sub-Process | Completion Step | < Use COMPLETED Column | Open, Sort and Date Stamp Incoming Mail | Process Mail |
| Mail Ops - 6.3 Sorting SF 50s to Airports or HQ | Sub-Process | Completion Step | < Use COMPLETED Column | Sorting SF 50s to Airports or HQ | Process Mail |
| Mail Ops - 7.0 Printing SF 1150s, FEHBs, TSPs | Process | Process Step | < Use PROCESSED Column | Printing SF 1150s, FEHBs, TSPs | SF 1150s, FEHBs, TSPs |
| Mail Ops - 7.1 Process Returned Mail | Sub-Process | Completion Step | < Use COMPLETED Column | Process Returned Mail | Process Mail |
| Mail Ops - 7.2 Processing Separation Packets | Sub-Process | Completion Step | < Use COMPLETED Column | Processing Separation Packets | Process Mail |
| Mail Ops - 7.3 SF 50 Distro - Printing SF 50s | Process | Completion Step | < Use COMPLETED Column | Printing SF 50s | Printing SF 50s |
| Mail Ops - 7.5 Creating FPO Footprints Cases | Step | Process Step | < Use PROCESSED Column | Open, Sort and Date Stamp Incoming Mail | Process Mail |
| Mail Ops - 7.6 Processing eOrientation Documents | Sub-Process | Completion Step | < Use COMPLETED Column | Processing eOrientation Documents | Process Mail |
| Mail Ops - 7.7 QA eOrientation Documents | Sub-Process | Process Step | < Use PROCESSED Column | Processing eOrientation Documents | Process Mail |
| Mail Ops - 7.8 Process INV 41 Forms | Process | Completion Step | < Use COMPLETED Column | Process INV 41 Forms | Process Mail |
| Mail Ops - 7.9 Emailing Tracking #s | Process | Completion Step | < Use COMPLETED Column | Process Emailing Tracking #s | Process Mail |
| Mail Ops - 8.0 Emailing PTS Tracking Numbers | Process | Completion Step | < Use COMPLETED Column | Process Emailing PTS Tracking #s | Process Support |
| Mail Ops - 8.1 Mail Run to Mail Stops | Step | Process Step | < Use PROCESSED Column | Open, Sort and Date Stamp Incoming Mail | Process Support |
| Mail Ops - 8.2 Mail Run to Plaza Level | Step | Process Step | < Use PROCESSED Column | Processing Separation Packets | Process Mail |
| Mail Ops - 9.1 QA Separation Packets | Sub-Process | Completion Step | < Use COMPLETED Column | | Process Support |
| Mail Ops - 9.2 QA Mail Sealing | Step | Process Step | < Use PROCESSED Column | | Process Mail |
| Mail Ops - 9.2 QA Address in EmpowHR | Step | Process Step | < Use PROCESSED Column | Process UPS/USPS Priority or Express | Process Mail |
| Mail Ops - 9.3 QA UPS/USPS Priority or Express | Sub-Process | Process Step | < Use PROCESSED Column | Debit Letter Mailing | Process Mail |
| Mail Ops - 10.1 Debit Letter Mailing | Sub-Process | Process Step | < Use PROCESSED Column | Debit Letter Mailing | Process Mail |
| Mail Ops - 10.2 Debit Letter - Redacting PII | Sub-Process | Process Step | < Use PROCESSED Column | Debit Letter Mailing | Process Mail |
| Mail Ops - 10.7 Debit Letter Research | Sub-Process | Process Step | < Use PROCESSED Column | Debit Letter Mailing | Process Mail |
| Mail Ops - 10.9 Debit Letter Mailing QA | Sub-Process | Completion Step | < Use COMPLETED Column | | Process Mail |
| Mail Ops - 11.1 Sort date incoming PTS mail | Sub-Process | Completion Step | < Use OPF Mgmt - 3.5 Scrub Prior Of | Scrub Prior OPF | Process Mail |
| Mail Ops - 11.2 Sort date incoming PTS fax | Sub-Process | Completion Step | < Use COMPLETED Column | Sort date incoming PTS mail | Process Mail |
| Mail Ops - 11.3 PTS Reduction | Step | Process Step | < Use PROCESSED Column | Sort date incoming PTS fax | Process Mail |
| Mail Ops - 11.5 PTS QA1 | Step | Process Step | < Use PROCESSED Column | PTS Reduction | Process Mail |
| Mail Ops - 11.6 PTS QA2 | Step | Process Step | < Use PROCESSED Column | PTS QA1 | Process Mail |
| Mail Ops - 11.7 PTS QA3 | Sub-Process | Completion Step | < Use COMPLETED Column | PTS QA2 | Process Mail |
| Mail Ops - 12.0 Label creation PTS | Sub-Process | Completion Step | < Use COMPLETED Column | PTS QA3 | Process Mail |
| OPF Acq - 1.1 Initial Request | Step | Process Step | < Use PROCESSED Column | Label creation PTS | OPF Acquisition |
| OPF Acq - 1.2 Followup | Step | Process Step | < Use PROCESSED Column | Initial Request | OPF Acquisition |
| OPF Acq - 1.3 Research | Step | Process Step | < Use PROCESSED Column | Followup and Research | OPF Acquisition |
| OPF Acq - 2.1 Scrub Prior OPF | Step | Process Step | < Use PROCESSED Column | Followup and Research | OPF Acquisition |
| OPF Acq - 2.2 Review Prior OPF and Close | Process | Completion Step | < Use COMPLETED Column | Merge Prior OPF and Close | OPF Acquisition |
| OPF Acq - 2.3 Review Prior OPF | Step | Process Step | < Use PROCESSED Column | Scrub Prior OPF | OPF Acquisition |
| OPF Acq - 3.1 Process Prior EMF | Step | Process Step | < Use PROCESSED Column | Process Prior EMF | OPF Acquisition |
| OPF Acq - 3.2 Process Prior EPF | Step | Process Step | < Use PROCESSED Column | Process Prior EPF | OPF Acquisition |
| OPF Acq - 4.0 Creating SCO SR | Process | Completion Step | < Use COMPLETED Column | Creating SCO SR | OPF Acquisition |
| OPF Acq - 9.0 QA | Step | Process Step | < Use PROCESSED Column | Prior EPF QA | OPF Acquisition |

| | | | |
|---|---|---|---|
| HOT | | On-boarding and Orientation | Recruitment |
| HOT | | On-boarding and Orientation | Recruitment |
| HOT | | On-boarding and Orientation | Recruitment |
| HOT | | On-boarding and Orientation | Recruitment |
| HOT | | On-boarding and Orientation | Recruitment |
| HOT | | On-boarding and Orientation | Recruitment |
| HOT | | On-boarding and Orientation | Recruitment |
| HOT | | On-boarding and Orientation | Recruitment |
| Mail Ops | Records | Physical Records | Data and Records Management |
| Mail Ops | Records | Physical Records | Data and Records Management |
| Mail Ops | Records | Physical Records | Data and Records Management |
| Mail Ops | Records | Physical Records | Data and Records Management |
| Mail Ops | Records | Physical Records | Data and Records Management |
| Mail Ops | Records | Physical Records | Data and Records Management |
| Mail Ops | Records | Physical Records | Data and Records Management |
| Mail Ops | Records | Physical Records | Data and Records Management |
| Mail Ops | Records | Physical Records | Data and Records Management |
| Mail Ops | Records | Physical Records | Data and Records Management |
| Mail Ops | Records | Physical Records | Data and Records Management |
| Mail Ops | Records | Physical Records | Data and Records Management |
| Mail Ops | Records | Physical Records | Data and Records Management |
| Mail Ops | Records | Physical Records | Data and Records Management |
| Mail Ops | Records | Physical Records | Data and Records Management |
| Mail Ops | Records | Physical Records | Data and Records Management |
| Mail Ops | Records | Physical Records | Data and Records Management |
| Mail Ops | Records | Physical Records | Data and Records Management |
| Mail Ops | Records | Physical Records | Data and Records Management |
| Mail Ops | Records | Physical Records | Data and Records Management |
| Mail Ops | Records | Physical Records | Data and Records Management |
| Mail Ops | Records | Physical Records | Data and Records Management |
| Mail Ops | Records | Physical Records | Data and Records Management |
| Mail Ops | Records | Physical Records | Data and Records Management |
| Mail Ops | Records | Physical Records | Data and Records Management |
| Mail Ops | Records | Physical Records | Data and Records Management |
| Mail Ops | Records | Physical Records | Data and Records Management |
| Mail Ops | Records | Physical Records | Data and Records Management |
| Mail Ops | Records | Physical Records | Data and Records Management |
| Mail Ops | Records | Physical Records | Data and Records Management |
| OPF Acquisition | Records | Physical Records | Data and Records Management |
| OPF Acquisition | Records | Physical Records | Data and Records Management |
| OPF Acquisition | Records | Physical Records | Data and Records Management |
| OPF Acquisition | Records | Physical Records | Data and Records Management |
| OPF Acquisition | Records | Physical Records | Data and Records Management |
| OPF Acquisition | Records | Physical Records | Data and Records Management |
| OPF Acquisition | Records | Physical Records | Data and Records Management |
| OPF Acquisition | Records | Physical Records | Data and Records Management |
| OPF Acquisition | Records | Physical Records | Data and Records Management |

Fig. 5C (1)

| | | | | |
|---|---|---|---|---|
| OPF Creation - 1. 1. Scrub EOD Packet | Step | Process Step | < Use PROCESSED Column | Scrub EOD Packet | OPF Creation |
| OPF Creation - 2.1 Request, Process Missing Docs | Step | Process Step | < Use PROCESSED Column | Request, Process Missing Docs | OPF Creation |
| OPF Creation - 9.0 QA | Process | Completion Step | < Use COMPLETED Column | OPF Creation QA | OPF Creation |
| OPF Disp GA - 1.1 Research, Process PU 50 | Step | Process Step | < Use PROCESSED Column | Disposition GA | Disposition GA |
| OPF Disp GA - 2.1 Request 50, 1150, Resume | Step | Process Step | < Use PROCESSED Column | Disposition GA | Disposition GA |
| OPF Disp GA - 2.2 Re-create Forms, DEC | Step | Process Step | < Use PROCESSED Column | Disposition GA | Disposition GA |
| OPF Disp GA - 3.1 Print eOPF, Ship | Process | Completion Step | < Use COMPLETED Column | Disposition GA | Disposition GA |
| OPF Disp GA - 6.1 Process SF 75 Request | Process | Completion Step | < Use COMPLETED Column | Process SF 75 Request | Disposition GA |
| OPF Disp GA - 9.0 QA | Step | Process Step | < Use PROCESSED Column | Disposition GA | Disposition GA |
| OPF Disp NPRC - 1.1 Process TSA EPF | Step | Process Step | < Use PROCESSED Column | Disposition NPRC | Disposition NPRC |
| OPF Disp NPRC - 2.1 Review eOPF | Step | Process Step | < Use PROCESSED Column | Disposition NPRC | Disposition NPRC |
| OPF Disp NPRC - 3.1 Scrub eOPF | Step | Process Step | < Use PROCESSED Column | Disposition NPRC | Disposition NPRC |
| OPF Disp NPRC - 3.2 Re-create Forms | Step | Process Step | < Use PROCESSED Column | Disposition NPRC | Disposition NPRC |
| OPF Disp NPRC - 3.3 Request 50, 1150, Resume | Step | Process Step | < Use PROCESSED Column | Disposition NPRC | Disposition NPRC |
| OPF Disp NPRC - 4.1 Print eOPF | Step | Process Step | < Use PROCESSED Column | Disposition NPRC | Disposition NPRC |
| OPF Disp NPRC - 4.2 Print Transcript of Service | Step | Process Step | < Use PROCESSED Column | Disposition NPRC | Disposition NPRC |
| OPF Disp NPRC - 5.1 Manifest, Box, Ship | Process | Completion Step | < Use COMPLETED Column | Disposition NPRC | Disposition NPRC |
| OPF Disp NPRC - 6.1 Disposition Interfile | Process | Completion Step | < Use COMPLETED Column | Disposition Interfile | Disposition Interfile |
| OPF Disp NPRC - 9.0 QA | Step | Process Step | < Use PROCESSED Column | Disposition NPRC | Disposition NPRC |
| OPF Mgmt - 1.1 OPF Refile | Process | Completion Step | < Use COMPLETED Column | OPF Filing | OPF Filing |
| OPF Mgmt - 1.2 OPF-Request | Process | Completion Step | < Use COMPLETED Column | OPF Filing | OPF Management |
| OPF Mgmt - 2.1 File Document | Process | Completion Step | < Use COMPLETED Column | File-Retrieve Document | Document Filing |
| OPF Mgmt - 2.2 File I-9 | Process | Completion Step | < Use COMPLETED Column | I-9 Maintenance | Document Filing |
| OPF Mgmt - 2.3 Retrieve Document | Process | Completion Step | < Use COMPLETED Column | File-Retrieve Document | Document Filing |
| OPF Mgmt - 2.4 Document Sort and Prep - Filing | Process | Process Step | < Use PROCESSED Column | Document Sort and Prep | Document Filing |
| OPF Mgmt - 2.5 File Documents | Process | Completion Step | < Use COMPLETED Column | File Documents | Document Filing |
| OPF Mgmt - 2.6 Bulk File Documents | Process | Process Step | < Use PROCESSED Column | Bulk File Documents | Archive Filing |
| OPF Mgmt - 2.7 Bulk File OPFs | Process | Process Step | < Use PROCESSED Column | Bulk File OPFs | Archive Filing |
| OPF Mgmt - 2.8 Filing 001 Cancellations | Process | Process Step | < Use PROCESSED Column | File Documents | Document Filing |
| OPF Mgmt - 3.1 Scrub OPF | Process | Completion Step | < Use COMPLETED Column | Scrub OPF | OPF Management |
| OPF Mgmt - 3.2 Remove 001 | Process | Completion Step | < Use COMPLETED Column | Scrub OPF | OPF Management |
| OPF Mgmt - 3.3 Document Research | Process | Completion Step | < Use COMPLETED Column | Scrub OPF | OPF Management |
| OPF Mgmt - 3.4 Scrub Merged OPF | Process | Completion Step | < Use COMPLETED Column | Scrub OPF | OPF Management |
| OPF Mgmt - 3.5 Scrub Prior OPF | Process | Completion Step | < Use COMPLETED Column | Scrub OPF | OPF Management |
| OPF Mgmt - 3.6 Scrub TSA EPR | Process | Completion Step | < Use COMPLETED Column | Scrub EPR | OPF Management |
| OPF Mgmt - 4.1 SR Employee Request View | Process | Completion Step | < Use COMPLETED Column | Employee Request View | OPF Management |
| OPF Mgmt - 4.2 SR File Letter of Warning | Process | Completion Step | < Use COMPLETED Column | File Letter of Warning | OPF Management |
| OPF Mgmt - 4.3 SR Insert documents into record | Process | Completion Step | < Use COMPLETED Column | Insert documents into record | OPF Management |
| OPF Mgmt - 4.4 SR Remove letter of warning | Process | Completion Step | < Use COMPLETED Column | Remove letter of warning | OPF Management |
| OPF Mgmt - 4.5 SR Request Document Copy | Process | Completion Step | < Use COMPLETED Column | Request Document Copy | OPF Management |
| OPF Mgmt - 4.6 SR Request Entire OPF Copy | Process | Completion Step | < Use COMPLETED Column | Request Entire OPF Copy | OPF Management |
| OPF Mgmt - 4.7 SR Request View of Original | Process | Completion Step | < Use COMPLETED Column | Request View of Original | OPF Management |
| OPF Mgmt - 4.8 SR Validate contents | Process | Completion Step | < Use COMPLETED Column | Validate contents | OPF Management |
| OPF Mgmt - 5.1 PII Duties - Research and Communication | Process | Process Step | < Use PROCESSED Column | Mail PII Letters | Data and Records - Data Privacy |
| OPF Mgmt - 6.2 Create Case Files | Process | Completion Step | < Enter TIME Without Quantity | Records Management | Records Management |
| OPF Mgmt - 6.3 Manage Records | Process | Completion Step | < Use COMPLETED Column | Records Management | Records Management |
| OPF Mgmt - 6.4 Destroy Case Files | Process | Completion Step | < Use COMPLETED Column | Records Management | Records Management |
| OPF Mgmt - 6.5 Destroy Records | Process | Completion Step | < Use COMPLETED Column | Records Management | Records Management |
| OPF Mgmt - 8.0 Acorda Update | Process | Completion Step | < Use COMPLETED Column | QA OPF | OPF Management |
| OPF Mgmt - 9.0 QA OPF | Sub-Process | Process Step | < Use PROCESSED Column | QA OPF | OPF Management |
| OPF Mgmt - 10.0 OPF Archive | Process | Completion Step | < Use COMPLETED Column | Archiving OPF | OPF Archive |
| DMG - Case File Mgmt. Destruction | Process | Completion Step | < Use COMPLETED Column | Case File Mgmt. Destruction | Case File Mgmt. Destruction |
| DMG - Other Task | Process | Completion Step | < Use COMPLETED Column | Records Mgmt - Other Task | Records Mgmt - Other Task |
| Benefits - Case File Mgmt. Destruction | Process | Completion Step | < Use COMPLETED Column | Case File Mgmt. Destruction | Case File Mgmt. Destruction |
| ICATS - Case File Mgmt. Destruction | Process | Completion Step | < Use COMPLETED Column | Case File Mgmt. Destruction | Case File Mgmt. Destruction |
| PTO - Case File Mgmt. Destruction | Process | Completion Step | < Use COMPLETED Column | Case File Mgmt. Destruction | Case File Mgmt. Destruction |
| PAR - Process Awards | Process | Completion Step | < Use COMPLETED Column | Awards Processing | Awards Processing |

Fig. 5C(2)

| | | | |
|---|---|---|---|
| OPF Creation | | Records | Physical Records | Data and Records Management |
| OPF Creation | | Records | Physical Records | Data and Records Management |
| OPF Creation | | Records | Physical Records | Data and Records Management |
| Disposition | | Records | Physical Records | Data and Records Management |
| Disposition | | Records | Physical Records | Data and Records Management |
| Disposition | | Records | Physical Records | Data and Records Management |
| Disposition | | Records | Physical Records | Data and Records Management |
| Disposition | | Records | Physical Records | Data and Records Management |
| Disposition | | Records | Physical Records | Data and Records Management |
| Disposition | | Records | Physical Records | Data and Records Management |
| Disposition | | Records | Physical Records | Data and Records Management |
| Disposition | | Records | Physical Records | Data and Records Management |
| Disposition | | Records | Physical Records | Data and Records Management |
| Disposition | | Records | Physical Records | Data and Records Management |
| Disposition | | Records | Physical Records | Data and Records Management |
| Disposition | | Records | Physical Records | Data and Records Management |
| Disposition | | Records | Physical Records | Data and Records Management |
| Disposition | | Records | Physical Records | Data and Records Management |
| Sort and File | | Records | Physical Records | Data and Records Management |
| Sort and File | | Records | Physical Records | Data and Records Management |
| Sort and File | | Records | Physical Records | Data and Records Management |
| Sort and File | | Records | Physical Records | Data and Records Management |
| Sort and File | | Records | Physical Records | Data and Records Management |
| Sort and File | | Records | Physical Records | Data and Records Management |
| Sort and File | | Records | Physical Records | Data and Records Management |
| Sort and File | | Records | Physical Records | Data and Records Management |
| OPF Management | | Records | Physical Records | Data and Records Management |
| OPF Management | | Records | Physical Records | Data and Records Management |
| OPF Management | | Records | Physical Records | Data and Records Management |
| OPF Management | | Records | Physical Records | Data and Records Management |
| OPF Management | | Records | Physical Records | Data and Records Management |
| OPF Management | | Records | Physical Records | Data and Records Management |
| OPF Management | | Records | Physical Records | Data and Records Management |
| OPF Management | | Records | Physical Records | Data and Records Management |
| Data and Records - Data Privacy | Data Privacy | | Data and Records Management | Data and Records Management |
| Data and Records - Data Privacy | Data Privacy | | Data and Records Management | Data and Records Management |
| Data and Records - Data Privacy | Data Privacy | | Data and Records Management | Data and Records Management |
| Data and Records - Data Privacy | Data Privacy | | Data and Records Management | Data and Records Management |
| Data and Records - Data Privacy | Data Privacy | | Data and Records Management | Data and Records Management |
| OPF Management | | Records | Physical Records | Data and Records Management |
| OPF Management | | Records | Physical Records | Data and Records Management |
| OPF Management | | Records | Physical Records | Data and Records Management |
| Records Management | Records Management | | Data and Records Management | Data and Records Management |
| Records Management | Records Management | | Data and Records Management | Data and Records Management |
| Benefits | | Benefits | Other Benefits | Compensation and Benefits |
| ICATS | | ICATS | Compensation Mgmt | Compensation and Benefits |
| PTO | | PTO | Payroll Administration | Payroll |
| PAR | | PAR | Employee Data | Data and Records Management |

Fig. 5D (1)

| | | | | |
|---|---|---|---|---|
| PAR - Process Non HCUP SF 52 | Process | Completion Step | < Use COMPLETED Column | SF 52 Processing | SF 52 Processing |
| PAR - Process HCUP SF 52 | Process | Completion Step | < Use COMPLETED Column | SF 52 Processing | SF 52 Processing |
| PAR - QA SF 52 | Step | Process Step | < Use PROCESSED Column | SF 52 QA | SF 52 Processing |
| PAR - Processing Payroll Document | Step | Completion Step | < Use COMPLETED Column | Payroll Document Processing | Payroll Document Processing |
| PAR - QA Payroll Document | Step | Completion Step | < Use COMPLETED Column | Payroll Document QA | Payroll Document Processing |
| PAR - Create Separation Packet | Step | Completion Step | < Use COMPLETED Column | Separation Packet Creation | Separation Packet Processing |
| PAR - QA Separation Packet | Step | Process Step | < Use PROCESSED Column | Separation Packet QA | Separation Packet Processing |
| PAR - Case File Mgmt. Destruction | Process | Completion Step | < Use COMPLETED Column | Case File Mgmt. Destruction | Case File Mgmt. Destruction |
| PAR - 52 Research | Step | Process Step | < Use PROCESSED Column | Research | SF 52 Processing |
| PAR - Payroll Document Research | Step | Process Step | < Use PROCESSED Column | Research | Payroll Document Processing |
| PAR - Separation Packet Research | Step | Process Step | < Use PROCESSED Column | Research | Separation Packet Processing |
| PAR - Awards Research | Step | Process Step | < Use PROCESSED Column | Research | Awards Processing |
| PAR - Reporting | Step | Process Step | < Use PROCESSED Column | Research | Reporting |
| Siebel - 1.1 Create SR | Process | Completion Step | < Use COMPLETED Column | Create SR | Create Service Request |
| Siebel - 2.1 SR upload prep | Process | Process Step | < Use PROCESSED Column | SR Upload Prep | SR Upload |
| Siebel - 2.2 Upload SR | Process | Completion Step | < Use COMPLETED Column | Upload SR | SR Upload |
| Siebel - 2.3 SR upload Prep QA 1 | Process | Process Step | < Use PROCESSED Column | SR Upload Prep QA 1 | SR Upload |
| Siebel - 2.4 SR upload QA 1 | Process | Process Step | < Use PROCESSED Column | SR Upload QA 1 | SR Upload |
| Siebel - 4.0 Not In Siebel Research | Step | Process Step | < Use PROCESSED Column | Not In Siebel Research | Create Service Request |
| Siebel - 7.4 Printing SF 52s from Smart PAM | Sub-Process | Completion Step | < Use COMPLETED Column | Printing SF 52s from Smart PAM | Process Siebel |
| Siebel - 8.0 Enter Activity | Process | Completion Step | < Use COMPLETED Column | Create Activity | Create Service Request |
| Siebel - 9.1 Siebel SR QA | Step | Process Step | < Use PROCESSED Column | Siebel SR QA | Create Service Request |
| Siebel - 9.2 Siebel Activity QA | Step | Process Step | < Use PROCESSED Column | Siebel Activity QA | Create Service Request |

Fig. 5D(2)

| | | | |
|---|---|---|---|
| PAR | | Employee Data | Data and Records Management |
| PAR | | Employee Data | Data and Records Management |
| PAR | | Employee Data | Data and Records Management |
| PAR | | Employee Data | Data and Records Management |
| PAR | | Employee Data | Data and Records Management |
| PAR | | Employee Data | Data and Records Management |
| PAR | | Employee Data | Data and Records Management |
| PAR | | Employee Data | Data and Records Management |
| PAR | | Employee Data | Data and Records Management |
| PAR | | Employee Data | Data and Records Management |
| PAR | | Employee Data | Data and Records Management |
| PAR | | Employee Data | Data and Records Management |
| PAR | | Employee Data | Data and Records Management |
| Siebel | Records | Enterprise Data | Data and Records Management |
| Siebel | Records | Enterprise Data | Data and Records Management |
| Siebel | Records | Enterprise Data | Data and Records Management |
| Siebel | Records | Physical Records | Data and Records Management |
| Siebel | Records | Enterprise Data | Data and Records Management |
| Siebel | Records | Enterprise Data | Data and Records Management |
| | | | |
| Siebel | Records | Enterprise Data | Data and Records Management |

*Fig. 6A*

| Productive Hour Productivity by Process by Date | | | | | | | |
|---|---|---|---|---|---|---|---|
| Time Type | | Direct ▼ | | | | | |
| Product of Productive Hr Productivity | | Date ▼ | | | | | |
| Task Description | ▼ | 1/1 | 1/2 | 1/3 | 1/4 | 1/5 | 1/6 | 1/7 |
| | | 0 | 0.0 | 0.0 | 0.0 | 0.0 | | |

118

- ☐ (Show All)
- ☐ Breaks
- ☐ eOPF – 1.1 Document Prep - Prior
- ☑ eOPF – 2.1 ScanDocument
- ☐ eOPF – 8.1 Research
- ☐ Indirect Misc 1
- ☐ Mail Ops – 2.1 Stuffing Envelopes – QA 1
- ☐ Meetings, Non-Team
- ☐ Meetings, Team
- ☐ One Down
- ☐ OPF Acq – 1.1 Initial Request
- ☐ OPF Acq – 1.2 Followup
- ☐ OPF Acq – 1.3 Research
- ☐ OPF Acq – 2.2 Merge Prior OPF and Close
- ☐ OPF Acq – 2.3 Review Prior OPF

[ OK ]  [ Cancel ]

| Productive Hour Productivity by Process by Date | | | | | | | | | | | |
|---|---|---|---|---|---|---|---|---|---|---|---|
| Time type | Direct | | | | | | | | | To Refre | |
| Productive Hr Productivity | Date | | | | | | | | | | |
| Task Description | 5/1 | 5/2 | 5/3 | 5/4 | 5/5 | 5/6 | 5/7 | 5/8 | 5/9 | 5/10 | |
| Recruit-Job descriptions created/updated | 2/8 | 4.0 | 0.0 | | | | | | | | |
| Recruit-Recruitment advertising and marketing services provided | 1.0 | 1.5 | 0.0 | | | | | | | | |

Productive Hour Productivity - EDM Tasks as of    Monday, March 31, 2008

Product of Productive Hr Productivity

| Task Description | Date | Name A | B | C | D | E | F | G | H |
|---|---|---|---|---|---|---|---|---|---|
| eOPF - 1.1 Document Prep - Prior | | | | | | | | | |
| | 3/4/2008 | 40.00 | | | 28.44 | | | | |
| | 3/5/2008 | | | | 18.57 | | | | |
| | 3/6/2008 | | | | 51.64 | | | | |
| | 3/10/2008 | | | 106.00 | | | | | |
| | 3/12/2008 | 98.67 | | | | | | | |
| | 3/13/2008 | 95.08 | | | | | | | |
| | 3/14/2008 | 64.63 | | | | | | | |
| | 3/17/2008 | | | | | | | | |
| | 3/18/2008 | | | | 73.45 | | | | |
| | 3/19/2008 | 40.00 | | | 1200.00 | | | | |
| | 3/24/2008 | | | | 44.00 | | | | |
| | 3/27/2008 | 15.38 | | | | | | | |
| | 3/31/2008 | 36.00 | | | | | | | |
| eOPF - 1.1 Document Prep - Prior Average | | 55.68 | | 106.00 | 236.02 | | | | 33.33 |
| eOPF - 1.2 Document Prep - Regular | | | | | | | | | |
| | 3/3/2008 | 113.00 | | 91.43 | 409.60 | | | | |
| | 3/4/2008 | 409.00 | | 106.67 | | | | | |
| | 3/5/2008 | 39.76 | | | | | | | |
| | 3/6/2008 | 6.17 | | | | | | | |
| | 3/7/2008 | 7.33 | | | | | | | |
| | 3/10/2008 | 26.00 | | | | | | | |
| | 3/11/2008 | | | | | | | | |
| | 3/12/2008 | | | | 561.33 | | | 100.00 | |
| | 3/13/2008 | | | | | | | | |
| | 3/14/2008 | 29.14 | | | | | | | 111.11 |
| | 3/17/2008 | 10.00 | | | | | | | |
| | 3/18/2008 | | | | | | | | |
| | 3/19/2008 | | | | | | | | |

*Fig. 8B*

| eOPF - 1.2 Document Prep - Regular | | | | | | |
|---|---|---|---|---|---|---|
| 3/20/2008 | | | | | | |
| 3/21/2008 | | | | 71.11 | | |
| 3/24/2008 | | 200.00 | | 272.00 | | |
| 3/25/2008 | | 37.50 | | 18.00 | | 60.00 |
| 3/26/2008 | 198.80 | 66.67 | | 18.96 | | 34.91 |
| 3/27/2008 | 260.89 | | | 5360.00 | | 20.00 |
| 3/31/2008 | 85.33 | | | | | 144.00 |
| 3/28/2008 | 58.59 | | | | | 571.43 |
| eOPF - 1.2 Document Prep - Regular Average | 103.67 | 101.39 | | 91.47 | | 257.32 | 105.56 |

| eOPF - 1.3 Document Prep - Payroll | |
|---|---|
| 3/6/2008 | 90.00 |
| 3/12/2008 | |
| eOPF - 1.3 Document Prep - Payroll Average | 90.00 |

| eOPF - 2.1 Scan Document | | |
|---|---|---|
| 3/3/2008 | | 206.09 |
| 3/4/2008 | | 234.53 |
| 3/5/2008 | | |
| 3/6/2008 | | |
| 3/7/2008 | | |
| 3/10/2008 | | |
| 3/11/2008 | | |
| 3/12/2008 | | |
| 3/13/2008 | | |
| 3/14/2008 | 105.33 | |
| 3/17/2008 | | 208.00 |
| 3/18/2008 | | 257.50 |
| 3/19/2008 | | 220.00 |
| 3/20/2008 | | |
| 3/21/2008 | | |
| 3/24/2008 | | |
| 3/25/2008 | 833.33 | |
| 3/26/2008 | | 147.50 |
| 3/27/2008 | | 528.00 |
| 3/31/2008 | | 192.00 |
| 3/28/2008 | | |
| eOPF - 2.1 Scan Document Average | 833.33 | 105.33 | 249.20 |

Fig. 8c

| eOPF - 3.1 Index | | | |
|---|---|---|---|
| 3/3/2008 | 134.27 | 154.27 | 180.25 |
| 3/4/2008 | 188.57 | 106.77 | 136.95 |
| 3/5/2008 | 134.22 | 100.33 | 102.88 |
| 3/6/2008 | 114.53 | 105.54 | 87.20 |
| 3/7/2008 | 73.60 | 110.50 | 65.85 |
| 3/10/2008 | | 114.14 | 170.12 |
| 3/11/2008 | | 100.92 | 127.36 |

*Fig. 10A*

MTD Team Productive Hour Productivity for all Records Tasks as of March 31, 2008

| Time Type | (Multiple Items) | | | | |
|---|---|---|---|---|---|
| | | | Data | | |
| Process | Sub-Process | Task Description | Sum of Total Daily Hours | Sum of Total Quantity Processed | Productive Hour Productivity |
| Archive Filing | Bulk File Documents | OPF Mgmt - 2.6 Bulk File Documents | 50.75 | 31828 | 627.15 |
| | Bulk File OPFs | OPF Mgmt - 2.7 Bulk File OPFs | 11.5 | 255 | 22.17 |
| Creative Service Request | Create Activity | Siebel - 2.1 Enter Activity | 6.75 | 111 | 16.44 |
| | Create SR | Siebel - 1.1 Create SR | 208.25 | 4869 | 23.38 |
| | | Siebel - 1.2 Upload SR | 5.5 | 3770 | 685.45 |
| | Siebel SR QA | Siebel - 9.1 Siebel SR QA | 44 | 21288 | 483.82 |
| | Not is Siebel Research | Siebel - 1.3 Not in Siebel Research | 2 | 94 | 47.00 |
| Disposition GA | Disposition GA | OPF Disp GA - 1.1 Research. Process PU 50 | 79.75 | 274 | 3.44 |
| | | OPF Disp GA - 2.1 Request 50, 1150, Resume | 1.25 | 24 | 19.20 |
| | | OPF Disp GA - 2.2 Re-create Forms, DEC | 1.5 | 6 | 4.00 |
| | | OPF Disp GA - 3.1 Print eOPF, Ship | 25.75 | 102 | 3.96 |
| | | OPF Disp GA - 9.0 QA | 14.75 | 114 | 7.73 |
| | Process SF 75 Request | OPF Disp GA - 8.1 Process SF 75 Request | 51.75 | 180 | 3.48 |
| Disposition NPRC | Disposition NPRC | OPF Disp NPRC - 2.1 Review eOPF | 112.5 | 1100 | 9.78 |
| | | OPF Disp NPRC - 3.1 Scrub eOPF | 190 | 698 | 3.67 |
| | | OPF Disp NPRC - 3.3 Request 50, 1150, Resume | 4 | 92 | 23.00 |
| | | OPF Disp NPRC - 4.1 Print eOPF | 6.75 | 189 | 28.00 |
| | | OPF Disp NPRC - 4.2 Print Transcript of Service | 33 | 1586 | 48.06 |
| | | OPF Disp NPRC - 5.1 Manifest, Box, Ship | 11 | 432 | 39.27 |
| | | OPF Disp NPRC - 9.0 QA | 31.5 | 230 | 7.30 |
| eOPF Scanning | Index | eOPF - 3.1 Index | 278.25 | 37497 | 135.74 |
| | Research | eOPF - 3.3 Document Review | 157.5 | 39183 | 248.78 |
| | | eOPF - 8.1 Research | 72.75 | 5847 | 80.37 |
| | Scan Document | eOPF - 1.1 Document Prep - Prior | 59.75 | 6319 | 105.76 |
| | | eOPF - 1.2 Document Prep - Regular | 284.25 | 30681 | 116.11 |
| | | eOPF - 1.3 Document Prep - Payroll | 4.75 | 263 | 55.37 |
| | | eOPF - 2.1 Scan Document | 186 | 40453 | 217.49 |
| | eOPF QA | eOPF - 9.0 QA | 14.25 | 984 | 69.05 |
| OPF Acquisition | Followup and Research | OPF Acq - 1.2 Followup | 75 | 443 | 5.91 |
| | | OPF Acq - 1.3 Research | 105 | 601 | 5.72 |
| | Initial Request | OPF Acq - 1.1 Initial Request | 29 | 309 | 10.66 |
| | Merge Prior OPF and Close | OPF Acq - 2.2 Merge Prior OPF and Close | 33.5 | 124 | 3.70 |
| | Scrub Prior OPF | OPF Acq - 2.3 Review Prior OPF | 18.25 | 73 | 4.00 |
| | Prior EPF QA | OPF Acq - 9.0 QA | 25.25 | 156 | 6.18 |
| | Process Prior EPF | OPF Acq - 3.2 Process Prior EPF | 8.25 | 131 | 15.88 |
| | Creating SCD SR | OPF Acq - 4.0 Creating SCD SR | 3 | 27 | 9.00 |

*Fig. 10A (Cont'd)*

| Process | Sub-Process | Task Description | Data | | |
|---|---|---|---|---|---|
| | | | Sum of Total Daily Hours | Sum of Total Quantity Processed | Productive Hour Productivity |
| OPF Management | Request View of Original | OPF Mgmt - 4.7 SR Request View of Original | 53.25 | 51 | 0.96 |
| | Scrub OPF | OPF Mgmt - 3.1 Scrub OPF | 21 | 112 | 5.33 |
| | | OPF Mgmt - 3.3 Document Research | 177.75 | 5966 | 33.56 |
| | | OPF Mgmt - 3.5 Scrub Prior OPF | 38.25 | 1549 | 40.50 |
| | File Letter of Warning | OPF Mgmt - 4.2 SR File Letter of Warning | 8.25 | 118 | 14.30 |
| | Remove letter of warning | OPF Mgmt - 4.4 SR Remove letter of warning | 16.75 | 162 | 9.67 |
| | Validate contents | OPF Mgmt - 4.8 SR Validate contents | 0.25 | 1 | 4.00 |
| | OPF Filing | OPF Mgmt - 1.2 OPF Request | 20.5 | 198 | 9.66 |
| | Request Entire OPF Copy | OPF Mgmt - 4.6 SR Request Entire OPF Copy | 2 | 4 | 2.00 |
| | Records Management | OPF Mgmt - 8.0 Acorde Update | 6 | 1401 | 233.50 |
| | Request Document Copy | OPF Mgmt - 4.5 SR Request Document Copy | 6.25 | 29 | 4.64 |
| | QA OPF | OPF Mgmt - 9.0 QA OPF | 2.5 | 850 | 340.00 |
| Process Mail | | Mail Ops - 2.3 Non-PII QA | 24.25 | 698 | 28.78 |
| | Open, Sort and Date Stamp Incoming Mail | Mail Ops - 6.2 Open, Sort and Date Stamp Incoming Mail | 86.25 | 5533 | 64.15 |
| | | Mail Ops - 7.5 Creating PPO Footprints Cases | 0.25 | 1 | 4.00 |
| | Process UPS/USPS Priority or Express | Mail Ops - 1.4 Process UPS/USPS Priority or Express | 50.75 | 1252 | 24.67 |
| | | Mail Ops - 9.3 QA UPS/USPS Priority or Express | 1.5 | 32 | 21.33 |

MTD Team Productive Hour Productivity for all Records Tasks as of    March 31, 2008

Time Type | (Multiple Items)

| Process | Sub-Process | Task Description | Sum of Total Daily Hours | Sum of Total Quantity Processed | Productive Hour Productivity |
|---|---|---|---|---|---|
| Process Mail | Stamping Envelopes | Mail Ops – 1.1 Creating SSN Lookup Spreadsheets | 29 | 2222 | 76.62 |
| | | Mail Ops – 1.2 Create Automated Labels | 9.25 | 1146 | 123.89 |
| | | Mail Ops – 1.3 Manual Labels | 60 | 1215 | 20.25 |
| | | Mail Ops – 2.1 Stuffing Envelopes – QA 1 | 63 | 1599 | 25.38 |
| | | Mail Ops – 2.2 Stamping Envelopes – QA 2 | 28 | 1189 | 42.46 |
| | Sort date incoming PTS mail | Mail Ops – 11.1 Sort date incoming PTS mail | 15 | 1000 | 66.67 |
| | Processing eOrientation Documents | Mail Ops – 7.6 Processing eOrientation Documents | 28.75 | 2320 | 80.70 |
| | Process Emailing Tracking #s | Mail Ops – 7.9 Emailing Tracking #s | 13.5 | 338 | 25.04 |
| | Sort and Date Stamp Faxes | Mail Ops – 6.1 Sort and Date Stamp Faxes | 40.5 | 2180 | 53.83 |
| | PTS QA3 | Mail Ops – 11.7 PTS QA3 | 18 | 887 | 49.28 |
| | Label creation PTS | Mail Ops – 12.0 Label creation PTS | 16.75 | 433 | 25.85 |
| | Processing Separation Packets | Mail Ops – 7.2 Processing Separation Packets | 9 | 531 | 59.00 |
| | | Mail Ops – 9.1 QA Separation Packets | 2.25 | 128 | 56.89 |
| | Debt Letter Mailing | Mail Ops – 10.2 Debt Letter – Redacting PII | 14.5 | 408 | 28.14 |
| | PTS Redaction | Mail Ops – 11.3 PTS Reduction | 26.5 | 425 | 16.04 |
| | Process INV 41 Forms | Mail Ops – 7.8 Process INV 41 Forms | 3 | 72 | 24.00 |
| | PTS QA1 | Mail Ops – 11.5 PTS QA1 | 6.25 | 96 | 15.36 |
| | Process Emailing PTS Tracking #s | Mail Ops – 8.0 Emailing PTS Tracking #s | 1.5 | 51 | 34.00 |
| | Process Returned Mail | Mail Ops – 7.1 Process Returned Mail | 0.75 | 15 | 20.00 |
| | PTS QA2 | Mail Ops – 11.6 PTS QA2 | 0.5 | 23 | 46.00 |
| | | Mail Ops – 8.1 Mail Run to Mail Stops | 37.5 | 0 | 0.00 |
| Process Support | | Mail Ops – 9.2 QA Mail Sealing | 5 | 0 | 0.00 |
| | | Mail Ops – 8.2 Mail Run to Plaza Level | 20.5 | 0 | 0.00 |
| Records Mgmt – Other Task | Open, Sort and Date Stamp Incoming Mail | Records Mgmt – DMG – Other Task | 89.75 | 7047 | 78.52 |
| Process Siebel | Printing SF 52s from Smart PAM | Siebel – 7.4 Printing SF 52s from Smart PAM | 77.75 | 1102 | 14.17 |
| Process Fax | Process Outbound Fax | Mail Ops – 5.1 Process Outbound Fax | 12.75 | 208 | 16.31 |
| Printing SF 50s | Printing SF 50s | Mail Ops – 7.3 SF 50 Distro – Printing SF 50s | 1.5 | 27 | 18.00 |
| Process Service Request | Process Service Request | Contact Center – Receive Service Request | 27.5 | 97 | 3.53 |
| Document Filing | File-Retrieve Document | OPF Mgmt – 2.1 File Document | 3.75 | 132 | 35.20 |
| | | OPF Mgmt – 2.3 Retrieve Document | 35.5 | 232 | 6.54 |
| | Document Sort and Prep | OPF Mgmt – 2.4 Document Sort and Prep - Filing | 4.5 | 250 | 55.56 |
| | File Documents | OPF Mgmt – 2.5 File Documents | 4.25 | 566 | 133.18 |
| Data and Records – Data Privacy | Mail PII Letters | OPF Mgmt – 5.1 PII Duties – Research and Communication | 0.75 | 15 | 20.00 |
| Records Management | Records Management | OPF Mgmt – 5.5 Destroy Records | 1.5 | 150 | 100.00 |
| OPF Creation | Request, Process Missing Docs | OPF Creation – 2.1 Request, Process Missing Docs | 0.5 | 15 | 30.00 |
| SF 1150s, FEHBs, TSPs | Printing SF 1150s, FEHBs, TSPs | Mail Ops – 7.0 Printing SF 1150s, FEHBs, TSPs | 1 | 3126 | 3126.00 |
| Disposition Interfile | Disposition Interfile | OPF Disp NPRC – 6.1 Disposition Interfile | 11.25 | 59 | 5.24 |
| OPF Archive | Archiving OPF | OPF Mgmt – 10.0 OPF Archive | 56.75 | 0 | 0.00 |
| Processing | Process EOD Packet | HOT – 7.3 Post Processing Packet Scrub | 7.5 | 60 | 8.00 |
| Grand Total | | | 3530.25 | 277968 | 78.74 |

Total Indirect Hours for Records as of Monday, March 31, 2008

Time Type: (Multiple Items)

| Reg Hours Name | Task Description | 3/3 | 3/4 | 3/5 | 3/6 | 3/7 | 3/10 | 3/11 | 3/12 | 3/13 | 3/14 | 3/17 | 3/18 | 3/19 | 3/20 | 3/21 | 3/24 |
|---|---|---|---|---|---|---|---|---|---|---|---|---|---|---|---|---|---|
| A | Breaks | 0.5 | 0.5 | 0.5 | 0.5 | 0.5 | 0.5 | 0.5 | 0.5 | 0.5 | | | 0.5 | 0.5 | 0.5 | 0.5 | 0.5 |
| | Meetings, Non-Team | | | | 0.5 | | | | | | | | | | | | |
| | Meetings, Team | | | | | | | | | 1.25 | | 0.75 | | | | | |
| | Metric Reporting | 0.5 | 0.5 | 0.5 | 0.5 | 0.5 | 1 | 0.5 | 0.5 | 0.5 | 0.5 | 0.5 | 0.5 | 0.5 | 0.5 | 0.5 | 0.5 |
| | Training, Personal Development | | | 1.5 | 1.5 | 1.5 | | | 1 | | | | 1 | 1 | 1 | 1 | |
| B Total | | 1 | 1 | 2.5 | 3 | 2.5 | 1.5 | 1 | 2 | 2.25 | 1 | 1.75 | 2 | 2 | 2 | 2 | 1 |
| | Breaks | 0.5 | 0.5 | 0.5 | 0.5 | 0.5 | | | 0.5 | 0.5 | 0.5 | 0.5 | 0.5 | 0.5 | 0.5 | 0.5 | 0.5 |
| | Meetings, Non-Team | | | | | | | | | 1.25 | | | | | | | |
| | Meetings, Team | | | | | | 1.5 | | 1.5 | | | | | | | 2.75 | |
| | Misc - Requires Comment | | | | | | | | | | | 0.5 | | | | 0.5 | |
| | System Down | | | | | | | | | | 0.75 | | | | | | |
| C Total | | 0.5 | 0.5 | 0.5 | 0.5 | 0.5 | 2 | 0.5 | 2 | 1.75 | 1.25 | 1 | 0.5 | 0.5 | 0.5 | 0.5 | 0.5 |
| | Breaks | 0.5 | 0.5 | 0.5 | 0.5 | 0.5 | | | 0.5 | 0.5 | 0.5 | | | | | | |
| | Meetings, Non-Team | | | | 0.25 | | | | | | 1.25 | | | | | | |
| | Meetings, Team | | | 2.5 | 0.5 | | | | | | | | | | | | |
| | Metric Reporting | | | | | | | 1 | 1 | 3.25 | | | | | | | |
| | Misc - Requires Comment | | 2.5 | 6.5 | 4.5 | 2.5 | 2 | 3.5 | 2.5 | 4 | 4.5 | 3 | | | | | 2.5 |
| | Productivity Tracking | 5 | 7 | | | | | | | | | | | 4.5 | 3 | | |
| | Training, Personal Development | | | | | | | | | | | 1 | | | | | |
| D Total | 5 | 7.5 | 9.5 | 6 | 5.5 | 3 | 2 | 4 | 4.5 | 2.5 | 2.5 | 7.5 | 6 | | 6 | 5 | 3 |
| | Breaks | 0.25 | 0.25 | 0.25 | 0.25 | 0.25 | 0.25 | 0.25 | 0.25 | 0.25 | | | | 0.25 | 0.25 | 0.25 | 0.25 | 0.25 |
| | Meetings, Non-Team | | | | | | | | | 1.25 | | | | | | | |
| E Total | 0.25 | 0.25 | 0.25 | 0.25 | 0.25 | 0.25 | 0.25 | 0.25 | 0.25 | 1.25 | | | 0.25 | 0.25 | 0.25 | 0.25 | 0.25 |
| | Breaks | 0.5 | 0.5 | 0.5 | 0.5 | 0.5 | 0.25 | 0.5 | 0.5 | 0.25 | | 0.5 | 0.5 | 0.5 | 0.5 | 0.5 | 0.5 |
| | Meetings, Non-Team | | | | | | | | | | | 0.5 | | | | | |
| | Meetings, Team | | | | 2.25 | | 0.25 | | 0.25 | | 1 | 0.25 | | 0.25 | | 0.25 | |
| | Productivity Tracking | | | 0.5 | | | | | | | | | | | | | |
| | Training, Federal HR | | | | | 1 | | | | | | | | | | | |
| F Total | 0.5 | 0.5 | 1 | 2.75 | 1.5 | 0.5 | 0.5 | 0.75 | 0.25 | 1 | 1.25 | 0.75 | 0.75 | 0.5 | 0.75 | 0.5 |
| | Breaks | 0.5 | 0.5 | 0.5 | 0.5 | 0.5 | 0.5 | 0.5 | 0.5 | 2.5 | 0.5 | 0.5 | 0.25 | 0.5 | 0.5 | 0.5 | 0.5 |
| | Meetings, Non-Team | | | | | | 0.5 | | | 1 | | | | | | | |
| | Meetings, Team | | | | | 1 | | | | | | | | | | | |
| | Misc - Requires Comment | | | | | | | | | 1.5 | | | | | | | |
| | Productivity Tracking | 0.25 | | | | | | | | | 2 | | | | | | 0.25 |
| G Total | 0.75 | 0.5 | 0.5 | 0.5 | 1.5 | 0.5 | 0.5 | 0.5 | 2.5 | 0.5 | 1 | 0.25 | 0.5 | 0.5 | 1 | 0.75 |
| | Breaks | 0.5 | | 0.5 | | | | | | | | | | | | | 0.5 |
| | Meetings, Non-Team | | | | | | 0.5 | | 0.5 | 2 | | | | | 1 | 0.5 | |

*Fig. 11B*

| | | | | | | | | | | | | |
|---|---|---|---|---|---|---|---|---|---|---|---|---|
| G (CONT'D) | Meetings, Team | | 2 | | 1 | 1 | 2.5 | 0.5 | | | | |
| | Metric Reporting | 0.5 | 0.5 | | 0.5 | | | | | 0.5 | 1 | 0.5 | 0.75 |
| | Misc - Requires Comment | | | | | | | | | | | | |
| | Process Improvement, Kaizen Project | | | | 1 | | | | | | | | |
| | Productivity Tracking | | | | | | 0.5 | | | | | 0.5 | |
| | PTO | 8 | 1 | | | | | | | | 1 | | |
| | Training, Personal Development | | | | | | | | | | | | 1.25 |
| H Total | | 8 | 3 | 2 | 2 | 1.5 | 4 | 1.5 | 3 | 3 | 3 | 3.5 | 3 |
| H | Breaks | 0.5 | 0.5 | 0.5 | 0.5 | 0.5 | 0.5 | 0.5 | 0.5 | 0.5 | 0.5 | 0.5 | 0.5 |
| | Meetings, Non-Team | | | | | | | | | 0.25 | | | |
| | Meetings, Team | | | | | 1.25 | | | 1 | 0.25 | | | |
| | Metric Reporting | 0.5 | 1 | | 1 | 0.75 | 1 | 0.5 | 0.5 | 1 | 0.5 | | 0.75 |
| | Misc - Requires Comment | | | 0.75 | | | | | 0.25 | | | 1 | |
| I Total | | 1 | 1.5 | 1.5 | 1.5 | 2.5 | 1.5 | 1 | 2 | 1.5 | 0.5 | 1.5 | 1.25 |
| I | Breaks | 0.5 | 0.5 | 0.5 | 0.5 | 0.5 | 0.5 | 0.5 | 0.5 | 0.5 | 0.5 | 0.5 | 0.5 |
| | Meetings, Team | 0.5 | 0.5 | | 0.5 | | | | | | | | |
| J Total | | 0.5 | 1 | 0.5 | 0.5 | 0.5 | 0.5 | 0.5 | 0.5 | 0.5 | 0.5 | 0.5 | 0.5 |
| J | Breaks | | 0.25 | 0.25 | 0.25 | 0.25 | 0.25 | 0.25 | 0.5 | 0.5 | 0.25 | | |
| | Meetings, Team | | 0.5 | 0.25 | 1 | | 0.5 | 0.25 | 3 | 0.25 | | | |
| | Misc - Requires Comment | | | | | | | | 3.5 | | 0.25 | | |
| | Productivity Tracking | | | | | | | | | 0.5 | | | |
| | Training, Federal HR | | | | | | | 1.25 | | | | | |
| K Total | | 0.25 | 0.75 | 0.5 | 1.25 | 0.25 | 0.75 | 1.75 | 2.75 | 1 | 0.5 | 0.75 | 0.25 |
| K | Breaks | 0.5 | 0.5 | 0.5 | 0.5 | 0.5 | 0.5 | 0.5 | 0.5 | 0.5 | 0.5 | 0.5 | 0.5 |
| | Meetings, Non-Team | | | | | | | | | 0.75 | | 0.25 | |
| | Meetings, Team | | | | | | | | | 0.5 | 0.25 | 0.25 | 0.25 |
| Total | | 0.5 | 0.5 | 0.5 | 0.5 | 0.5 | 0.5 | 1.25 | 0.5 | 1.25 | 0.75 | 0.5 | 0.25 |
| Grand Total | | 18.75 | 17 | 22 | 19.25 | 18 | 15.25 | 17 | 27.5 | 20.25 | 15.25 | 9.5 | 8.25 | 16.25 | 14.75 | 10.75 |

Daily Utilization Rate as of   Monday, March 31, 2008

| Average of Daily Util Rate | Date | | | | | | | | | | | | | | | | | |
|---|---|---|---|---|---|---|---|---|---|---|---|---|---|---|---|---|---|---|
| Name | 3/3/2008 | 3/4/2008 | 3/5/2008 | 3/6/2008 | 3/7/2008 | 3/10/2008 | 3/11/2008 | 3/12/2008 | 3/13/2008 | 3/14/2008 | 3/17/2008 | 3/18/2008 | 3/19/2008 | 3/20/2008 | 3/21/2008 | 3/24/2008 | 3/25/2008 |
| A | 89% | 89% | 71% | 63% | 69% | 81% | 89% | 78% | 76% | 88% | 83% | 80% | 78% | 75% | 75% | 90% | 80% |
| B | 94% | 94% | 94% | 94% | 94% | 75% | 94% | 76% | 79% | 85% | 76% | 94% | 94% | 94% | 94% | 94% | 94% |
| C | 31% | 12% | 10% | 36% | 44% | 64% | 47% | 34% | 15% | 15% | 35% | | | 41% | 21% | 63% | 50% |
| D | 94% | 93% | 84% | 72% | | 95% | 94% | 94% | 81% | 97% | | 94% | 95% | 96% | 93% | 94% | 85% |
| E | 93% | 88% | 94% | 88% | #DIV/0! | 94% | 94% | 94% | 95% | 92% | 89% | 94% | #DIV/0! | 95% | 95% | 94% | 94% |
| F | 88% | 81% | 81% | 81% | 84% | 69% | 81% | 78% | 75% | 88% | 81% | 91% | 88% | 66% | 81% | 84% | 81% |
| G | 0% | 0% | 4% | 25% | 0% | 15% | 0% | 13% | | 0% | 0% | 38% | 33% | | 3% | 0% | |
| H | 91% | 94% | 94% | 94% | 84% | 94% | 97% | 94% | 69% | 94% | 90% | 98% | 94% | 95% | 88% | 93% | 97% |
| I | 0% | 14% | 0% | 25% | 0% | 0% | 19% | 6% | 0% | 0% | | 0% | 0% | 0% | 25% | 0% | 0% |
| J | 81% | 88% | 88% | 88% | 88% | 88% | 88% | 88% | 75% | 88% | 0% | 84% | 88% | 25% | 88% | 91% | 81% |
| K | 94% | 88% | 62% | 34% | 75% | 81% | 91% | 94% | 77% | 83% | 50% | 94% | 94% | 94% | 93% | 94% | 94% |
| L | 91% | 81% | 92% | 84% | 91% | 91% | 91% | 91% | 75% | 91% | 80% | 93% | 91% | 85% | 91% | | 88% |
| M | 75% | 85% | 81% | 81% | 81% | 75% | 88% | 81% | 81% | 88% | 81% | 0% | 88% | 88% | 75% | 0% | 0% |
| N | 66% | 0% | 75% | 63% | 0% | 88% | 75% | 58% | 33% | 44% | 90% | 85% | 72% | 78% | 81% | 85% | 93% |
| O | 94% | 94% | 96% | 95% | 94% | | | | | | | | | | | | |
| P | 84% | 88% | 88% | 84% | 88% | | 81% | 94% | 50% | 81% | 94% | 88% | 84% | 81% | 84% | 81% | 75% |
| Q | 94% | | | 63% | 94% | | | | | | | | | | | 31% | 94% |
| R | 0% | 0% | 0% | 0% | 0% | 0% | 0% | 0% | 0% | 0% | 0% | 0% | 0% | 0% | 0% | 6% | 0% |
| S | 94% | 96% | 94% | 93% | 94% | 94% | 94% | 94% | 79% | 94% | 86% | | 94% | 96% | 95% | 97% | 94% |
| T | 85% | | | | | | | 75% | 0% | 64% | 76% | 89% | 81% | 72% | | 59% | 86% |
| U | 91% | 91% | 91% | 59% | 72% | 91% | 75% | 53% | 38% | 22% | 69% | 91% | 78% | 84% | 0% | 72% | 84% |
| V | 93% | 94% | 88% | 88% | 88% | 94% | 94% | 88% | 78% | 94% | 88% | 93% | 94% | 96% | 94% | 94% | 83% |
| W | #DIV/0! | 93% | 78% | 95% | 94% | 93% | 94% | 93% | | 94% | 94% | 94% | 94% | | 94% | 94% | 94% |
| X | 88% | 89% | 88% | 85% | 82% | 88% | 88% | 88% | 63% | 88% | 81% | 88% | 88% | 88% | 88% | 88% | 86% |
| Y | 88% | 75% | 89% | 84% | 84% | 88% | 84% | 88% | 69% | 88% | 78% | 88% | 78% | 53% | 41% | 68% | 50% |
| Z | 96% | 96% | 95% | 94% | 94% | 94% | 94% | 94% | 72% | 94% | 88% | 94% | 94% | 94% | 94% | 94% | 94% |
| AA | 85% | 95% | 98% | 82% | 83% | 53% | 97% | 97% | 74% | 97% | 95% | 96% | 98% | 78% | 8% | 83% | 81% |
| BB | 94% | 97% | 97% | 97% | 56% | 97% | 97% | 97% | 81% | 58% | 88% | 97% | 87% | 94% | 94% | 84% | 88% |
| CC | | 88% | 92% | 92% | 92% | 81% | 92% | 92% | 66% | 58% | 88% | 91% | 91% | 91% | | | |
| DD | 94% | 94% | 93% | 94% | 94% | 93% | 94% | 62% | 78% | 94% | 84% | 97% | 97% | 97% | 97% | 97% | 97% |

| Date | Day of the Week | Standard Hours | Holiday Hours | my Hours |
|---|---|---|---|---|
| 1 Feb | Friday | 8 | 0 | 8 |
| 2 Feb | Saturday | 0 | 0 | 0 |
| 3 Feb | Sunday | 0 | 0 | 0 |
| 4 Feb | Monday | 8 | 0 | 8 |
| 5 Feb | Tuesday | 8 | 0 | 8 |
| 6 Feb | Wednesday | 8 | 0 | 8 |
| 7 Feb | Thursday | 8 | 0 | 8 |
| 8 Feb | Friday | 8 | 0 | 8 |
| 9 Feb | Saturday | 0 | 0 | 0 |

Dimension: These are the categories by which a reports can be extracted

| Dimension | Description |
|---|---|
| Client Contract | To segregate data by name of the Deal associated to time entry |
| Date By Month | To segregate data by Day, Month, Year |
| Ppweek | To segregate data by Day and Week |
| Enterprise ID | The enterprise id associated with each time entry |
| GeoLocation | To segregate data by Country or Geographic region |
| User Client Contract | The client contract updated in the user profile |
| User Full Name | User Name in First Name Last Name format |
| User Service Line | The service line updated in user profile |
| User Status | The user status e.g. Active/Inactive |
| Action Type | Process or comp step/Utilized Unknown |
| Process | The task category |
| Process Category | The Service Lines only (Excluding Indirect time) |
| Service Line | The Service Line including Indirect time |
| Task Description | The task category |
| Task Status | Status of Task e.g. Active/Inactive |
| Team | Team aligned to each Task category |
| Time Category | Client Funded Direct/Client Funded Indirect/Non client funded |
| Time Type | Direct/Indirect |
| Work Type | Time Worked/Time not worked to segregate Leave from time spent at work |

Pivot Table Field List

Drag items to the Pivot Table report

- Client Contract
- Date By Month
- Ppweek
- Enterprise ID
- GeoLocation
- User Client Contract
- User Full Name
- User Service Line
- User Status
- Action Type
- Process
- Process Category
- Svc Line
- Task Description
- Task Status
- Team
- Time Category
- Time Type
- Work Type
- Regular Hours
- Overtime HOurs
- Quantity Processed
- Quantity Completed
- Total Direct Hours
- Total Indirect Hours

*Fig. 21*

| | |
|---|---|
| Non-Calculated Data: | |
| Regulated Hours | Time entered as regular hour by users |
| Overtime Hours | Time entered as overtime hours by users |
| Quantity Processed | Volume worked by not completed – pending & WIP |
| Quantity Completed | Volume completed during the day |
| Categorized Data: | |
| Client funded Direct | Reg or OT hrs categorized as a client funded direct task |
| Client funded Indirect | Reg or OT hours categorized as client funded indirect task |
| Non Client Funded | Reg or OT hours categorized as a non-client funded task |
| Calculated Data: | |
| Indirect Time | Reg or OT hours categorized as a client funded indirect task + non-client funded task |
| Total hours | Sum of Client funded direct + client funded indirect + non client funded |
| Daily utilization Rate | Total Client funded time/Total Time |
| Product Hour Productivity | Total quantity completed/Total Time |
| Paid Hour Productivity | Total quantity completed + Processed/Total Time |

*Fig. 22*

Agent wise Daily Hrs Worked:

| Client Contract | Accenture U-2 | ▸ |
|---|---|---|
| GeoLocation | UM | ▸ |
| Syc Line | Employee Lifecycle Management | ▸ |

| Total Hours Worked | Year | ▸ | Month | Day |
|---|---|---|---|---|
| | 2008 | | August | |

| Enterprise Id ▸ | 1 | | | | | | | | | | | | | | | | | | | | August |
|---|---|---|---|---|---|---|---|---|---|---|---|---|---|---|---|---|---|---|---|---|---|
| | | 4 | 5 | 6 | 7 | 8 | 11 | 12 | 13 | 14 | 15 | 18 | 19 | 20 | 21 | 22 | 26 | 27 | 28 | 29 | |
| | 7.00 | 7.50 | 7.25 | 7.25 | 7.50 | 7.25 | 7.25 | 7.50 | 7.40 | 7.15 | 6.35 | 7.45 | 7.45 | 7.10 | 7.50 | 6.40 | 7.15 | 7.40 | 7.05 | 7.30 | 144.20 |
| | 5.00 | 4.75 | 6.00 | 4.00 | 7.00 | 5.00 | 6.00 | 6.50 | 5.45 | 7.20 | 7.15 | 1.00 | 4.20 | 7.45 | 7.00 | 7.50 | 7.45 | 6.50 | 2.00 | | 107.15 |
| | | | 7.00 | 6.75 | 6.75 | | | 7.00 | 7.25 | | | | | | | | | | | | 41.75 |
| | 7.25 | 7.00 | 7.25 | | 5.25 | 5.50 | | | | | | | | | | | | | | | 32.25 |
| | | | | | | | | | | | | | | | | | | | | | |
| | | | 0.50 | | | | | | | | | | | | | | | | | | 0.50 |
| | | 3.50 | 2.50 | | | | | 7.50 | 7.75 | | | | | | | | | | | | 6.00 |
| | | 6.00 | 4.00 | | | | | 4.00 | | | 3.00 | 4.00 | 5.00 | 1.40 | 3.50 | 8.00 | 3.50 | 6.00 | | 1.75 | 36.50 |
| | | 2.00 | 1.00 | 3.00 | | 4.00 | | 3.00 | 3.00 | 3.00 | 3.00 | 3.00 | 3.00 | 3.00 | 9.00 | 3.00 | 8.00 | 8.00 | 3.00 | 4.50 | 59.40 |
| | | | | | | | | 5.00 | 5.00 | 5.00 | 5.00 | | | 5.50 | 5.50 | 4.15 | 3.00 | 3.00 | 3.00 | 3.00 | 49.00 |
| | | | | | | | | | | | | | | | | | 5.00 | 5.00 | 1.30 | | 45.45 |
| Grand Total | 19.25 | 30.75 | 35.50 | 21.00 | 30.75 | 24.50 | 17.25 | 40.50 | 35.85 | 22.35 | 24.50 | 15.45 | 19.65 | 24.45 | 32.50 | 29.05 | 34.10 | 35.90 | 13.35 | 15.55 | 523.20 |

Fig. 23A

Agent wise Time category and Volume

| Client Contract | (Multiple Items) | | | | | | | | | | | | | | | | | | | | | | | | | |
|---|---|---|---|---|---|---|---|---|---|---|---|---|---|---|---|---|---|---|---|---|---|---|---|---|---|---|
| GeoLocation | All GeoLocation | | | | | | | | | | | | | | | | | | | | | | | | | |
| Svc Line | All Svc Line | | | | | | | | | | | | | | | | | | | | | | | | | |

| | | Year | | Month | Day | | | | | | | | | | | | | | | | | | | | | |
| | | 2008 | | | | | | | | | | | | | | | | | | | | | | | | |
| | | August | | | | | | | | | | | | | | | | | | | | | | | | August |
| Enterprise Id | Data | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 25 | 26 | 27 | 28 | 29 | 30 | |
| | Client Funded Direct | 0.00 | | | | | | | | | | | | | | | | | | | | | | | | | | | | | 21.00 |
| | Client Funded Indirect | 0.00 | | | | | | | | | | | | | | | | | | | | | | | | | | | | | 124.00 |
| | Non Client Funded | 8.00 | | | | | | | | | | | | | | | | | | | | | | | | | | | | | 24.00 |
| | Regular Hours | 8.00 | | | | | | | | | | | | | | | | | | | | | | | | | | | | | 169.00 |
| | Overtime Hours | 0.00 | | | | | | | | | | | | | | | | | | | | | | | | | | | | | 0.00 |
| | Total Daily Hours | 8.00 | | | | | | | | | | | | | | | | | | | | | | | | | | | | | 189.00 |
| | Quantity Processed | 0.00 | | | | | | | | | | | | | | | | | | | | | | | | | | | | | 26.00 |
| | Quantity Completed | 0.00 | | | | | | | | | | | | | | | | | | | | | | | | | | | | | 8.00 |
| | Client Funded Direct | 7.50 | | | | | | | | | | | | | | | | | | | | | | | | | | | | | 110.70 |
| | Client Funded Indirect | 0.50 | | | | | | | | | | | | | | | | | | | | | | | | | | | | | 11.50 |
| | Non Client Funded | 0.00 | | | | | | | | | | | | | | | | | | | | | | | | | | | | | 37.80 |
| | Regular Hours | 8.00 | | | | | | | | | | | | | | | | | | | | | | | | | | | | | 180.00 |
| | Overtime Hours | 0.00 | | | | | | | | | | | | | | | | | | | | | | | | | | | | | 0.00 |
| | Total Daily Hours | 8.00 | | | | | | | | | | | | | | | | | | | | | | | | | | | | | 150.00 |
| | Quantity Processed | 0.00 | | | | | | | | | | | | | | | | | | | | | | | | | | | | | 0.00 |
| | Quantity Completed | 14.00 | | | | | | | | | | | | | | | | | | | | | | | | | | | | | 203.00 |
| | Client Funded Direct | 0.00 | | | | | | | | | | | | | | | | | | | | | | | | | | | | | 121.75 |
| | Client Funded Indirect | 0.00 | | | | | | | | | | | | | | | | | | | | | | | | | | | | | 0.00 |
| | Non Client Funded | 8.00 | | | | | | | | | | | | | | | | | | | | | | | | | | | | | 48.00 |
| | Regular Hours | 8.00 | | | | | | | | | | | | | | | | | | | | | | | | | | | | | 189.75 |
| | Overtime Hours | 0.00 | | | | | | | | | | | | | | | | | | | | | | | | | | | | | 0.00 |
| | Total Daily Hours | 8.00 | | | | | | | | | | | | | | | | | | | | | | | | | | | | | 159.75 |
| | Quantity Processed | 0.00 | | | | | | | | | | | | | | | | | | | | | | | | | | | | | 989.00 |

Agent wise Time category and Volume

| Client Contract | (Multiple Items) | | |
|---|---|---|---|
| GeoLocation | All GeoLocation | ▸ | ▸ |
| Svc Line | All Svc Line | ▸ | |

| | | Year | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| | | 2008 | | | | | | | | | | | | | | | | ▸ Month Day | | | | | | | | | | | | | |
| | | August | | | | | | | | | | | | | | | | | | | | | | | | | | | | | | August |
| Enterprise Id ▸ | Data ▸ | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 25 | 26 | 27 | 28 | 29 | 30 | | | |
| | Quantity Completed | 0.00 | | | | | | | | | | | | | | | | | | | | | | | | | | | | | | 0.00 |
| | Client Funded Direct | | 3.00 | | | | | | | | | | | | | | | | | | | | | | | | | | | | | 31.30 |
| | Client Funded Indirect | | 0.00 | | | | | | | | | | | | | | | | | | | | | | | | | | | | | 0.00 |
| | Non Client Funded | | 0.00 | | | | | | | | | | | | | | | | | | | | | | | | | | | | | 0.00 |
| | Regular Hours | | 3.00 | | | | | | | | | | | | | | | | | | | | | | | | | | | | | 31.30 |
| | Overtime Hours | | 0.00 | | | | | | | | | | | | | | | | | | | | | | | | | | | | | 0.00 |
| | Total Daily Hours | | 3.00 | | | | | | | | | | | | | | | | | | | | | | | | | | | | | 31.30 |
| | Quantity Processed | | 9.00 | | | | | | | | | | | | | | | | | | | | | | | | | | | | | 91.00 |
| | Quantity Completed | | 0.00 | | | | | | | | | | | | | | | | | | | | | | | | | | | | | 0.00 |

Agent wise Task Category worked:

| Client Contract | (Multiple Items) | | | | |
|---|---|---|---|---|---|
| Date By Month | September | | | | |

| | | | | Data | |
|---|---|---|---|---|---|
| Enterprise Id | Service Line | | Task Description | Total Daily Hours | Quantity Processed | Quantity Completed |

| Enterprise Id | Service Line | | Task Description | Total Daily Hours | Quantity Processed | Quantity Completed |
|---|---|---|---|---|---|---|
| | Employee Lifecycle N | | ELM-ERA – Internal Employee Rel Case Admin | 3.00 | 6.00 | 0.00 |
| | Employee Lifecycle Management Total | | | 3.00 | 6.00 | 0.00 |
| | | Indirect | Client – Incident and Problem Management Support | 7.00 | 0.00 | 0.00 |
| | | | Client – Performance Management | 5.00 | 0.00 | 0.00 |
| | | | Client – Productivity Tracking | 2.00 | 0.00 | 0.00 |
| | | | Client – Standard Reporting | 16.00 | 0.00 | 0.00 |
| | | | Client – Team Meeting | 22.00 | 0.00 | 0.00 |
| | | | Client – Team/Project Management | 9.00 | 0.00 | 0.00 |
| | | Indirect Total | | 61.00 | 0.00 | 0.00 |
| Total | | | | 64.00 | 6.00 | 0.00 |
| | | Indirect | Client – Team Meeting | 4.50 | 0.00 | 0.00 |
| | | | Client – Unassigned/Down Time | 1.50 | 0.00 | 0.00 |
| | | | Non-Client - Training | 14.50 | 0.00 | 0.00 |
| | | Indirect Total | | 20.50 | 0.00 | 0.00 |
| | | Recruitment | Recruit-Offer Documentation Processed | 44.50 | 0.00 | 71.00 |
| | | Recruitment Total | | 44.50 | 0.00 | 71.00 |
| Total | | | | 65.00 | 0.00 | 71.00 |
| | Employee Lifecycle N | | ELM-Other Task | 58.20 | 484.00 | 0.00 |
| | Employee Lifecycle Management Total | | | 58.20 | 484.00 | 0.00 |
| Total | | | | 58.20 | 484.00 | 0.00 |
| | Employee Lifecycle N | | ELM-ERA – Internal Employee Appeals Case | 0.25 | 1.00 | 0.00 |
| | | | ELM-ERA – Internal Employee Rel Case Admin | 5.75 | 14.00 | 0.00 |
| | Employee Lifecycle Management Total | | | 6.00 | 15.00 | 0.00 |
| Total | | | | 6.00 | 15.00 | 0.00 |
| | Employee Lifecycle N | | ELM-LA – Unplanned Absence Admin | 3.75 | 5.00 | 0.00 |
| | Employee Lifecycle Management Total | | | 3.75 | 5.00 | 0.00 |
| Total | | | | 3.75 | 5.00 | 0.00 |

*Fig. 23C*

Task Category wise productivity comparison across deals:

| Date By Month | August | | | | | |
|---|---|---|---|---|---|---|
| GeoLocation | All GeoLocation | | | | | |

| | | Client Contract ▶ | | | | |
|---|---|---|---|---|---|---|
| Paid Hour Productivity | | | | | | |
| Service Line ▶ | Task Description | Accenture CA | Accenture UK | Accenture US | | | Grand Total |
| Employee Lifecycle Management | ELM-EDA – Employ Contracts Update/Correct | | 1.1 | 2.7 | 3.3 | 4.0 | 5.4 | 17.6 | 3.8 | 2.7 | 4.6 | 3.3 |
| | ELM-EDA – Personal Data Create/New Hire | | 2.4 | 0.5 | 1.0 | 2.4 | 5.3 | 18.6 | 3.8 | 1.8 | 5.6 | 4.3 |
| | ELM-EDA – Commit ESS Updates | | | 0.6 | | | | | 2.4 | | 202.8 | 14.3 |
| | ELM-EDA – Commit MSS Updates | | | | | 4.0 | 3.0 | | 2.8 | | | 2.8 |
| | ELM-EDA – Employ Data Update/Correct/Del | 12.0 | 2.9 | 3.1 | 4.3 | 5.1 | 3.7 | 17.0 | 3.3 | 2.7 | 10.5 | 4.4 |
| | ELM-EDA – Employment Data Create/Position Mgmt | 4.0 | 3.0 | 5.1 | 0.9 | 9.9 | 3.4 | 4.5 | 3.1 | 2.9 | 7.4 | 4.8 |
| | ELM-EDA – Mass Data Create/Update/Corr/Del | 205.9 | 2.7 | 41.9 | | 18.0 | 3.5 | 50.2 | 30.8 | 14.2 | 244.0 | 48.1 |
| | ELM-EDA – Personal Data Update/Correct/Del | 8.5 | 8.0 | 0.3 | 0.5 | 6.3 | 3.0 | 5.9 | 3.1 | 3.7 | 12.7 | 2.2 |
| | ELM-EDA – Quality Assurance | 436.4 | | 12.8 | 6.7 | 9.0 | 11.9 | 0.7 | 5.8 | 8.2 | 16.4 | 13.7 |
| | ELM-EDA – Verification of Employment Data | 2.9 | 5.3 | 0.3 | 2.2 | | 6.8 | | 2.0 | 2.3 | 9.3 | 4.5 |
| | ELM-Exit – Employee Exit Admin | | 9.2 | 0.5 | 1.2 | 2.3 | 5.8 | 11.8 | 3.4 | 3.1 | 5.9 | 8.2 |
| | ELM-Exit – Exit Date Amendment | | | 1.0 | | | 7.7 | 2.0 | 3.0 | 2.3 | | 4.0 |
| | ELM-Exit – Exit Interview Admin | | | 4.0 | | 2.4 | 6.9 | | 12.0 | 4.6 | 12.0 | 5.2 |
| | ELM-Exit – Multiple Employee Exit Admin | | | | | | | 7.5 | | | | 7.5 |
| | ELM-Exit – Quality Assurance | | 4.6 | 1.9 | | 20.3 | 11.8 | | 10.2 | 9.2 | 9.1 | 5.0 |
| | ELM-Exit – Severance Program Admin | | | | | | | 2.4 | | | 2.8 | 2.5 |
| | ELM-LA – Absence Without Leave (AWOL) | | | 3.0 | | | | | | | | 3.0 |
| | ELM-LA – Compliance Reporting | | | 3.9 | | | | | 1.5 | | | 3.8 |
| | ELM-LA – Early Return/Leave Extension Cancel | | | 5.3 | | 3.2 | 9.0 | | 1.6 | 2.0 | | 3.4 |
| | ELM-LA – File Transmission/Inbound/Outbound | | | 7.7 | | | | | | 11.0 | | 8.0 |
| | ELM-LA – Planned Leaves | | 5.0 | 6.4 | 0.1 | 4.1 | 0.1 | 2.9 | 2.2 | 2.4 | 2.5 | 3.3 |
| | ELM-LA – QA | | 11.4 | 9.5 | 1.4 | 3.2 | 2.1 | 10.4 | 3.4 | 1.4 | | 3.8 |
| | ELM-LA – Return to Word Admin | | | 5.1 | | 2.2 | 10.3 | 5.0 | 2.0 | 1.9 | | 5.7 |
| | ELM-LA – Unplanned Absence Admin | | 1.5 | 6.4 | | | 2.9 | 9.6 | 1.3 | 2.5 | | 3.0 |
| | ELM-LA – Vendor Relations (by Type) | | | 2.5 | | | 4.0 | 10.7 | | 6.4 | 1.5 | 3.0 |
| | ELM-Manage Employee Mobility Admin | | 1.2 | | | | 2.8 | | | 12.7 | | 4.2 |
| Employee Lifecycle Management Total | | 55.7 | 6.9 | 5.8 | 2.3 | 7.9 | 3.3 | 8.6 | 4.8 | 3.3 | 7.3 | 5.2 |
| Grand Total | | 55.7 | 6.9 | 5.8 | 2.3 | 7.9 | 3.3 | 8.6 | 4.8 | 3.3 | 7.3 | 5.2 |

*Fig. 23D*

Task Category wise productivity comparison across months:

| GeoLocation | All GeoLocation ▼ | | | | | | |
|---|---|---|---|---|---|---|---|
| Client Contract | Accenture UKI ▼ | | | | | | |
| Svc line | All Svc Line ▼ | | | | | | |

| Paid Hour Productivity | | | | ▼ Month | | | |
|---|---|---|---|---|---|---|---|
| | Year | | | | | | |
| | 2008 | | | | | | 2008 | Grand |
| Task Description | February | March | April | July | August | September | Total | Total |
| ELM-EDA -- Employ Contracts Update/Correct | 3.7 | 5.0 | 7.1 | 5.3 | 1.1 | 13.3 | 8.3 | 8.3 |
| ELM-EDA -- Personal Data Create/New Hire | | | | | 2.4 | 2.5 | 2.5 | 2.5 |
| ELM-EDA -- Employ Data Update/Correct/Del | | | | 4.1 | 2.9 | 3.4 | 3.2 | 3.2 |
| ELM-EDA -- Employment Data Create / Position Mgmt | | | | 2.9 | 3.0 | 2.5 | 3.0 | 3.0 |
| ELM-EDA -- Mass Data Create/Update/Corr/Del | | | | | 2.7 | 2.8 | 2.8 | 2.8 |
| ELM-EDA -- Personal Data Update/Correct/Del | | | | | 8.0 | 4.0 | 7.7 | 7.7 |
| ELM-EDA -- Quality Assurance | | | | 7.4 | | 5.0 | 7.1 | 7.1 |
| ELM-EDA -- Verification of Employment Data | | | | | 5.3 | 7.5 | 6.0 | 6.0 |
| ELM-Ergonomic Requests | | | | | 1.5 | | 1.5 | 1.5 |
| ELM-Exit -- Employee Exit Admin | 7.6 | 6.8 | 14.9 | 7.7 | 9.2 | 7.8 | 8.5 | 8.5 |
| ELM-Exit -- Exit Date Amendment | | | | | | 12.1 | 12.1 | 12.1 |
| ELM-Exit -- Multiple Employee Exit Admin | | | | | | 4.8 | 4.8 | 4.8 |
| ELM-Exit -- Quality Assurance | | | | 6.9 | 4.6 | 3.3 | 4.1 | 4.1 |
| ELM-LA -- Absence Without Leave (AWOL) | | | | | | 5.7 | 5.7 | 5.7 |
| ELM-LA -- Planned Leaves | | | | | 5.0 | 4.6 | 4.7 | 4.7 |
| ELM-LA -- QA | | | | 11.4 | 11.4 | 11.4 | 11.4 | 11.4 |
| ELM-LA -- Return to Work Admin | | | | | | 4.9 | 4.9 | 4.9 |
| ELM-LA -- Unplanned Absence Admin | | | | | 1.5 | 6.9 | 6.5 | 6.5 |
| Grand Total | 6.9 | 6.5 | 14.3 | 7.3 | 6.9 | 6.6 | 6.9 | 6.9 |

*Fig. 23E*

Task Category wise productivity comparison across months between Geographies:

| Client Contract | | Accenture UKI | | | | | | | | |
|---|---|---|---|---|---|---|---|---|---|---|
| Svc line | | All Svc Line | | | | | | | | |

| Paid Hour Productivity | | Year | Month | | | | | | | |
|---|---|---|---|---|---|---|---|---|---|---|
| | | 2008 | | | | | | | 2008 Total | Grand Total |
| Task Description | Geography | February | March | April | July | August | September | | | |
| ELM-EDA – Employ Contracts Update/Correct | India | 3.7 | 5.0 | 7.1 | 5.3 | 3.8 | 16.0 | | 11.6 | 11.6 |
| | UK | | | | | 0.8 | 1.7 | | 1.1 | 1.1 |
| ELM-EDA – Employ Contracts Update/Correct Total | | 3.7 | 5.0 | 7.1 | 5.3 | 1.1 | 13.3 | | 8.3 | 8.3 |
| ELM-EDA – Personal Data Create/New Hire | India | | | | | 2.4 | 2.5 | | 2.5 | 2.5 |
| ELM-EDA – Personal Data Create/New Hire Total | | | | | | 2.4 | 2.5 | | 2.5 | 2.5 |
| ELM-EDA – Employ Data Update/Correct/Del | India | | | | 4.1 | 2.9 | 3.4 | | 3.2 | 3.2 |
| | UK | | | | | 1.0 | 4.8 | | 4.5 | 4.5 |
| ELM-EDA – Employ Data Update/Correct/Del Total | | | | | 4.1 | 2.9 | 3.4 | | 3.2 | 3.2 |
| ELM-EDA – Employment Data Create / Position Mgmt | India | | | | 2.9 | 3.0 | 2.5 | | 3.0 | 3.0 |
| ELM-EDA – Employment Data Create / Position Mgmt Total | | | | | 2.9 | 3.0 | 2.5 | | 3.0 | 3.0 |
| ELM-EDA – Mass Data Create/Update/Corr/Del | India | | | | | 2.7 | 2.8 | | 2.8 | 2.8 |
| ELM-EDA – Mass Data Create/Update/Corr/Del Total | | | | | | 2.7 | 2.8 | | 2.8 | 2.8 |
| ELM-EDA – Personal Data Update/Correct/Del | India | | | | | 10.5 | 4.0 | | 9.8 | 9.8 |
| | UK | | | | | 3.0 | | | 3.0 | 3.0 |
| ELM-EDA – Personal Data Update/Correct/Del Total | | | | | | 8.0 | 4.0 | | 7.7 | 7.7 |
| ELM-EDA – Quality Assurance | India | | | | 7.4 | | | | 7.4 | 7.4 |
| ELM-EDA – Quality Assurance Total | | | | | 7.4 | | | | 7.4 | 7.4 |
| ELM-EDA – Verification of Employment Data | Not Set | | | | | | 5.0 | | 5.0 | 5.0 |
| | UK | | | | | | 5.0 | | 7.1 | 7.1 |
| ELM-EDA – Verification of Employment Data Total | | | | | | 6.0 | | | 6.0 | 6.0 |
| | | | | | | 5.3 | 7.5 | | 6.0 | 6.0 |
| | | | | | | 5.3 | 7.5 | | 6.0 | 6.0 |
| Grand Total | | 3.7 | 5.0 | 7.1 | 4.6 | 3.5 | 5.5 | | 4.5 | 4.5 |

Daily Utilization & Productivity comparison across deals:

| Svc Line | All Svc Line | | | | | | | | | | | | |
|---|---|---|---|---|---|---|---|---|---|---|---|---|---|
| | | Year ▼ | Month ▼ | Data ▼ | | | | | | | | | |
| | | 2008 | | | | | | | | | | 2008 Product Hour Productivity | 2008 Paid Hour Productivity | 2008 Daily Utilization Rate |
| | | July | | | August | | | September | | | | | |
| Client Contract ▼ | Geography ▼ | Product Hour Productivity | Paid Hour Productivity | Daily Utilization Rate | Product Hour Productivity | Paid Hour Productivity | Daily Utilization Rate | Product Hour Productivity | Paid Hour Productivity | Daily Utilization Rate | | | |
| Accenture UKI | Canada | 0.4 | 3.4 | 1.0 | 0.0 | 7.0 | 1.0 | | 8.4 | 0.9 | 0.0 | 7.2 | 1.0 |
| | India | 0.0 | 0.2 | 1.0 | 1.7 | 1.3 | 0.9 | 1.2 | 1.6 | 0.9 | 1.3 | 1.4 | 0.9 |
| | UK | | | | 0.5 | 7.3 | 1.0 | 0.5 | | 1.0 | 0.5 | 7.3 | 1.0 |
| | US | 0.3 | 3.3 | 1.0 | 2.0 | 5.2 | 0.9 | 1.0 | 8.5 | 0.9 | 2.0 | 5.6 | 0.9 |
| Accenture UKI Total | | | | | 1.3 | 0.9 | | | | | 1.1 | 0.9 | 0.9 |
| | Europe | 0.0 | 8.0 | 0.5 | 0.0 | 2.0 | 1.0 | 0.0 | 1.8 | 1.0 | 0.0 | 1.9 | 1.0 |
| | India | 0.0 | 8.0 | 0.5 | 0.0 | 2.0 | 1.0 | 0.0 | 1.8 | 1.0 | 0.0 | 1.9 | 1.0 |
| Total | | 0.2 | 1.9 | 0.8 | 0.3 | 2.2 | 0.8 | 0.6 | 2.6 | 0.8 | 0.3 | 2.2 | 0.8 |
| | India | 0.8 | 2.4 | 1.0 | 0.1 | 0.1 | 1.0 | 0.3 | 1.0 | 1.0 | 0.2 | 0.3 | 1.0 |
| | UK | | | | | 1.7 | 0.9 | | | | 1.2 | 2.0 | 0.8 |
| | US | 0.2 | 1.9 | 0.8 | 0.3 | 2.1 | 0.8 | 0.4 | 1.9 | 0.9 | 0.3 | 2.0 | 0.8 |
| Total | | 0.1 | 0.7 | 0.9 | 0.1 | 0.8 | 1.0 | 0.6 | 1.3 | 1.0 | 0.3 | 0.9 | 0.9 |
| | India | 2.2 | 3.1 | 0.9 | 0.0 | 0.5 | 1.0 | 1.2 | 3.5 | 0.8 | 1.6 | 3.3 | 0.9 |
| | US | 0.5 | 1.0 | 0.9 | 0.1 | 0.8 | 1.0 | 0.7 | 1.7 | 1.0 | 0.5 | 1.2 | 0.9 |
| Total | | 2.7 | 3.2 | 1.0 | 2.3 | 2.5 | 0.9 | 2.0 | 2.3 | 0.9 | 2.3 | 2.6 | 0.9 |
| | India | 23.5 | 57.6 | 1.0 | 19.5 | 55.1 | 1.0 | 10.7 | 33.6 | 1.0 | 15.9 | 44.8 | 1.0 |
| | US | 6.5 | 13.2 | 1.0 | 4.9 | 10.5 | 0.9 | 4.1 | 10.0 | 0.9 | 4.9 | 10.9 | 0.9 |
| Total | | 0.0 | 0.2 | 0.4 | 0.0 | 0.2 | 1.0 | 0.4 | 0.9 | 0.5 | 0.1 | 0.4 | 0.3 |
| | India | 2.1 | 2.1 | 1.0 | 0.0 | 0.0 | 1.0 | 0.7 | 2.2 | 0.8 | 0.8 | 1.7 | 1.0 |
| Total | | 0.8 | 0.9 | 0.6 | 0.0 | 0.1 | 0.6 | 0.6 | 1.6 | 0.8 | 0.5 | 1.1 | 0.6 |
| Grand Total | | 1.8 | 4.8 | 0.9 | 1.6 | 5.2 | 0.9 | 1.4 | 5.6 | 0.9 | 1.6 | 5.3 | 0.9 |

Productivity comparison across Service Line:

Client Contract: All Client Contract

| | | Year ▶ 2008 | | | | | | 2008 Product Hour Productivity | 2008 Paid Hour Productivity | Total Product Hour Productivity | Total Paid Hour Productivity |
|---|---|---|---|---|---|---|---|---|---|---|---|
| | | Month ▶ July | | August | | September | | | | | |
| | | Data ▶ Product Hour Productivity | Paid Hour Productivity | Product Hour Productivity | Paid Hour Productivity | Product Hour Productivity | Paid Hour Productivity | | | | |
| Service Line ▶ | Geography ▶ | | | | | | | | | | |
| Benefits | India | 0.4 | 1.7 | 1.0 | 1.8 | 2.1 | 2.9 | 1.1 | 2.1 | 1.1 | 2.1 |
| | UK | | | 4.1 | 4.4 | 2.6 | 4.0 | 3.2 | 4.1 | 3.2 | 4.1 |
| | US | 4.8 | 10.1 | 6.1 | 6.2 | 0.4 | 1.8 | 1.7 | 3.9 | 1.7 | 3.9 |
| Benefits Total | | 0.8 | 2.4 | 2.4 | 2.9 | 2.1 | 3.2 | 1.8 | 2.9 | 1.8 | 2.9 |
| Compensation | Europe | | | 0.0 | 1.3 | | | 0.0 | 1.3 | 0.0 | 1.3 |
| | India | 0.7 | 0.8 | 1.3 | 1.5 | 2.3 | 2.8 | 1.5 | 1.8 | 1.5 | 1.8 |
| | UK | | | 0.0 | 0.2 | 0.7 | 0.9 | 0.4 | 0.5 | 0.4 | 0.5 |
| | US | | | 0.1 | 0.9 | 0.2 | 1.3 | 0.2 | 1.1 | 0.2 | 1.1 |
| Compensation Total | | 0.7 | 0.8 | 0.5 | 1.0 | 1.1 | 1.8 | 0.8 | 1.3 | 0.8 | 1.3 |
| Employee Lifecycle Management | Europe | | | 8.7 | 8.7 | 5.8 | 5.8 | 7.4 | 7.4 | 7.4 | 7.4 |
| | India | 1.6 | 4.7 | 1.4 | 6.4 | 1.6 | 5.5 | 1.5 | 5.6 | 1.5 | 5.6 |
| | UK | 0.0 | 0.3 | 1.1 | 1.2 | 2.3 | 2.5 | 1.7 | 1.9 | 1.7 | 1.9 |
| | US | 4.2 | 6.4 | 3.0 | 6.1 | 4.8 | 6.9 | 4.2 | 6.5 | 4.2 | 6.5 |
| Employee Lifecycle Management Total | | 1.7 | 4.7 | 1.4 | 5.4 | 1.9 | 4.9 | 1.7 | 5.0 | 1.7 | 5.0 |
| PandP | Canada | | | 1.2 | 1.9 | 0.0 | 0.7 | | | | |
| | India | 0.6 | 7.0 | 3.7 | 4.3 | 2.6 | 6.8 | 1.5 | 1.6 | 1.5 | 1.6 |
| | UK | 0.1 | 0.1 | 2.0 | 2.0 | 1.8 | 1.9 | 5.2 | 6.4 | 5.2 | 6.4 |
| | US | | | 7.6 | 8.9 | 1.8 | 2.8 | | | | |
| PandP Total | | 0.6 | 6.4 | 5.1 | 6.1 | 1.6 | 3.3 | 3.5 | 5.0 | 3.5 | 5.0 |
| Payroll | India | 5.9 | 6.0 | 5.6 | 5.6 | 4.9 | 4.9 | 5.5 | 5.5 | 5.5 | 5.5 |
| | UK | 0.0 | 0.3 | 0.0 | 0.1 | 0.0 | 0.2 | 0.0 | 0.2 | 0.0 | 0.2 |
| | US | 21.2 | 51.1 | 34.5 | 96.1 | 3.3 | 11.1 | 7.9 | 22.7 | 7.9 | 22.7 |
| Payroll Total | | 13.1 | 28.6 | 11.2 | 28.7 | 3.1 | 9.5 | 6.2 | 16.1 | 6.2 | 16.1 |
| Recruitment | Canada | 0.0 | 4.1 | 0.6 | 2.7 | 0.6 | 2.7 | 0.6 | 2.7 | 0.6 | 2.7 |
| | Europe | | | | | 0.0 | 0.1 | 0.0 | 0.1 | 0.0 | 0.1 |
| | India | 0.1 | 5.8 | 3.4 | 6.8 | 2.8 | 9.4 | 3.1 | 8.0 | 3.1 | 8.0 |
| | UK | 1.4 | 1.9 | 1.7 | 4.1 | 1.5 | 4.3 | 1.6 | 4.2 | 1.6 | 4.2 |
| | US | 0.7 | 1.7 | 0.9 | 3.3 | 1.0 | 3.7 | 1.0 | 3.5 | 1.0 | 3.5 |
| Recruitment Total | | 0.4 | 4.0 | 1.7 | 4.4 | 1.8 | 5.6 | 1.7 | 5.0 | 1.7 | 5.0 |
| Grand Total | | 2.8 | 7.0 | 1.9 | 5.2 | 1.8 | 5.7 | 2.0 | 5.6 | 2.0 | 5.6 |

Fig. 23H

Effort estimation by Product:

| GeoLocation | All GeoLocation | | | | | |
|---|---|---|---|---|---|---|
| Client Contract | All Client Contract | | | | | |
| User Service line | Benefits | | | | | |
| Date By Month | (Multiple Items) | | | | | |
| | Data | | | | | Derived |
| Task Description | Quantity Processed | Quantity Completed | Client Funded Direct | Product Hour Productivity | Paid Hour Productivity | Rework Expected |
| Benefits-Benefits QA | 324.0 | 120.0 | 104.6 | 1.1 | 4.2 | 270% |
| Benefits-Benefits Vendor Management | 0.0 | 11.0 | 35.3 | 0.3 | 0.3 | 0% |
| Benefits-Data Audit | 298.0 | 188.0 | 289.9 | 0.6 | 1.7 | 159% |
| Benefits-File Transmissions | 2.0 | 36.0 | 14.4 | 2.5 | 2.6 | 6% |
| Benefits-Invoice / Account Reconciliation | 0.0 | 10.0 | 2.0 | 5.0 | 5.0 | 0% |
| Benefits-Mail Creation / Process Outbound and Returned Mail | 1039.0 | 1410.0 | 370.3 | 3.8 | 6.6 | 74% |
| Benefits-Other Task | 396.0 | 1727.0 | 1036.0 | 1.7 | 2.0 | 23% |
| Benefits-Reimbursement Handling | 32.0 | 159.0 | 87.2 | 1.8 | 2.2 | 20% |
| Benefits-System Updates | 6.0 | 42.0 | 20.5 | 2.0 | 2.3 | 14% |
| Benefits-WQM Incident Handling | 1113.0 | 705.0 | 756.8 | 0.9 | 2.4 | 158% |
| Grand Total | 3210.0 | 4408.0 | 2716.9 | 1.6 | 2.8 | 72% |

INDIVIDUAL PRODUCTIVITY AND UTILIZATION TRACKING TOOL

Applicant claims, under 35 U.S.C. §119(e), the benefit of priority of the filing date of May 14, 2008 of U.S. provisional patent application Ser. No. 61/127,583, filed on the aforementioned date, the entire contents of which are incorporated herein by reference.

BACKGROUND OF THE INVENTION

1. Field of the Invention

The present invention relates to devices and processes that track the production and utilization of an individual that works for an organization, such as a business.

2. Related Art

It is a well known for an organization, such as a business, to track the productivity of its employees. Such tracking entails having an employee record the hours that he or she works during a day of work. Such recording can include either the total number of hours worked during the day or the number of hours worked on each project worked during the day. Such recording does not include recording the number of units processed or completed during each project. Thus, it is not possible to calculate productivity and utilization via calculating productive hour productivity which requires the factors of: 1) the direct task being worked, 2) the direct time applied to the direct task during that session of work and 3) the number of units processed or units completed.

There are various examples of known tracking systems/tools that are incapable of calculating productivity and utilization. For example, Accenture's Service Management Suite captures time based on Accenture's WBS internal accounting code elements. Such capturing is inadequate for the purpose of calculating productivity and utilization since WBS elements are placed at too high of a level to give visibility into the time applied to a single task and the number of units completed during that specific session of work.

Another example of a tracking tool/system is Microsoft's Project Web Access that captures time based on projects and their sub-tasks. While the tool is effective in supporting a multi-tier project model by both 1) capturing time at a task level as well as 2) rolling up time for higher level reporting, it is inadequate for the purposes of calculating productivity and utilization. In particular, productivity and utilization cannot be calculated without capturing both the time applied to a single task and the number of units completed.

Yet another example of a tracking tool/system is the project-based costing tool known as Greenbook. While Greenbook is effective in supporting multi-tiered project costing, it is inadequate because calculating productivity and utilization requires both the time applied and the number of units completed.

Besides the inability of calculating productivity and utilization, known tracking tools/systems, are incapable of performing data analysis regarding multiple individual productivity parameters, such as 1) measuring individual performance against the "Speed of the Process", 2) managing utilization by person by team, 3) capacity planning and real-time line-balancing decisions, 4) forecasting when there is variation in capacity or demand, 5) measuring monthly production (client demand) trends by person by process by day, 6) calculating process cycle efficiency (total direct time/cycle time), 7) evaluating total time applied to tasks which are common to multiple value streams (complexity) and 8) completing calculations needed for implementing workload levelling.

SUMMARY OF THE INVENTION

One aspect of the present invention regards a productivity and utilization tracking system for an organization that includes individuals, the system including an input device, a processor in communication with the input device and a memory in communication with the processor. The memory includes a database for each of the individuals of the organization that: 1) identifies each direct task worked on by each of the individuals during a session of work, 2) includes direct time applied to each of the identified direct tasks during the session of work, and 3) includes a number of units processed or completed for each of the identified direct tasks corresponding to each of the applied direct times, wherein each direct task, direct time and number of units is entered into the memory via the input device. The system further includes a visual display electrically connected to the processor, wherein the processor prepares a screen to be shown on the visual display, the screen containing information regarding productivity and/or utilization for an individual based on direct tasks, direct times and number of units associated with the individual that are present in the database.

A second aspect of the present invention regards a method of tracking productivity and utilization information regarding an individual of an organization. The method including entering via an input device information regarding the individual into a database that: 1) identifies each direct task worked on by the individual during a session of work, 2) direct time applied to each of the identified direct tasks during the session of work, and 3) a number of units processed or completed for each of the identified direct tasks corresponding to each of the applied direct times. The method further including displaying on a display information regarding productivity and utilization for the individual based on the direct tasks, the direct times and the number of units that are present in the database.

One or more aspects of the present invention provide the advantage of allowing a user to input productivity and utilization data and to have that data formatted so as to be analyzed in an efficient manner.

One or more aspects of the present invention provide the advantage of providing feedback to an employee on that employee's productivity and utilization.

One or more aspects of the present invention provide the advantage of helping a user understand utilization patterns and productivity of resources across various deals and service lines across geographies.

One or more aspects of the present invention help to identify ways to improve processes performed by workers.

One or more aspects of the present invention help to eliminate waste and create lean, cost-effective processes performed by workers.

BRIEF DESCRIPTION OF THE DRAWINGS

FIG. 3 shows an embodiment of a productivity and utilization tracking tool screen that can be displayed by the individual productivity and utilization tracking systems of FIGS. 1 and 16;

FIG. 4 is a table of possible indirect tasks that can be used with the productivity and utilization tracking tool screen of FIG. 3;

FIGS. 5A(1)-5D(2) is an embodiment of a look-up table that includes direct tasks that can be used by the productivity and utilization tracking tool screen of FIG. 3;

FIGS. 6A-B show an embodiment of a productivity screen that can be displayed by the individual productivity and utilization tracking systems of FIGS. 1 and 16;

FIGS. 8A-C show an embodiment of a monthly productive hour productivity report generated by the managerial productivity and utilization tracking systems of FIGS. 7A-B in part by data displayed on the productivity screen of FIG. 6;

FIGS. 10A-B shows an embodiment of a second monthly productive hour productivity report generated by the managerial productivity and utilization tracking systems of FIGS. 7A-B in part by data displayed the productivity screen of FIG. 6;

FIGS. 11A-B show an embodiment of a monthly indirect hour report generated by the managerial productivity and utilization tracking systems of FIGS. 7A-B in part by data displayed the productivity screen of FIG. 6;

FIG. 14 shows an embodiment of a monthly utilization rate report generated by the managerial productivity and utilization tracking systems of FIGS. 7A-B in part by data displayed the productivity screen of FIG. 6;

FIG. 15 shows an embodiment of a forecast screen that can be displayed by the individual productivity and utilization tracking systems of FIGS. 1 and 16;

FIGS. 21 and 22 show examples of reports that can be generated and dimensions associated with such reports, wherein the reports are generated by the web-based individual productivity and utilization tracking system of FIGS. 17-18; and FIGS. 23A-I show examples of reports generated by the web-based individual productivity and utilization tracking system of FIGS. 17-18.

DETAILED DESCRIPTION OF THE PRESENTLY PREFERRED EMBODIMENTS

Figure 1:
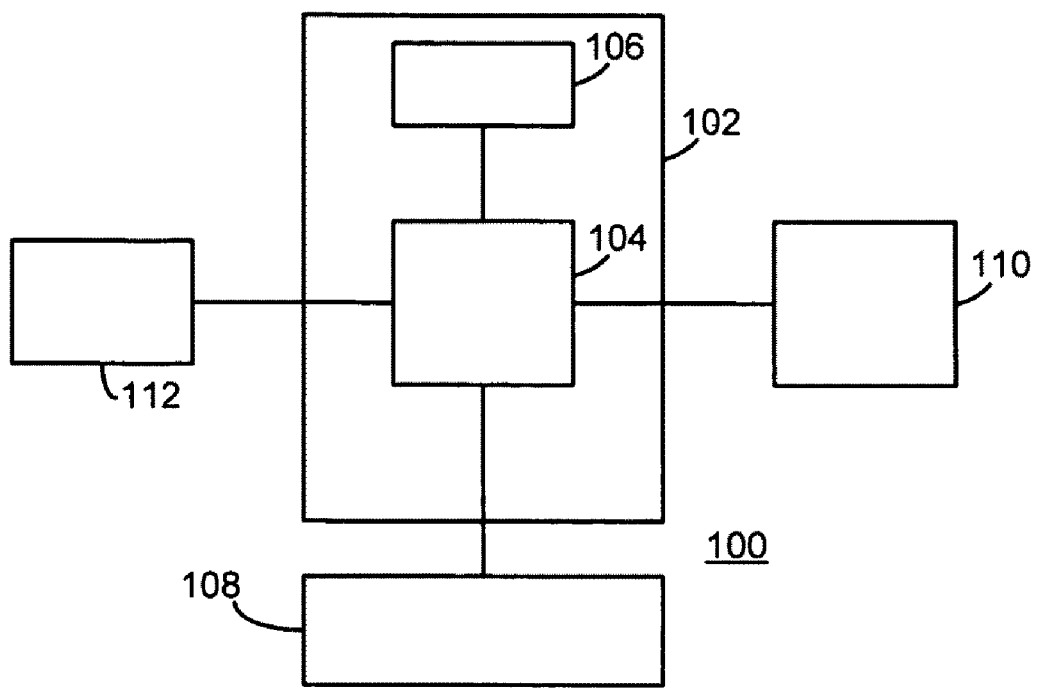
FIG. 1 schematically shows an embodiment of an individual productivity and utilization tracking system in accordance with the present invention.

An embodiment of the present invention is shown in FIG. 1. In particular, FIG. 1 schematically shows a productivity and utilization tracking system or tool 100 that includes a finance processor 102 that includes a microprocessor 104 electrically connected to a memory 106. The memory 106 stores a finance program that includes a database, the contents of which will be discussed below.

Data is input indirectly into the microprocessor 104 via an input device 108. Examples of possible input devices 108 are a keyboard, a microphone, a touch screen or a mouse that are part of computer hardware system, such as a laptop computer. A display 110 and a printer 112 can be electrically connected to or form part of the computer hardware system.

Figure 16:
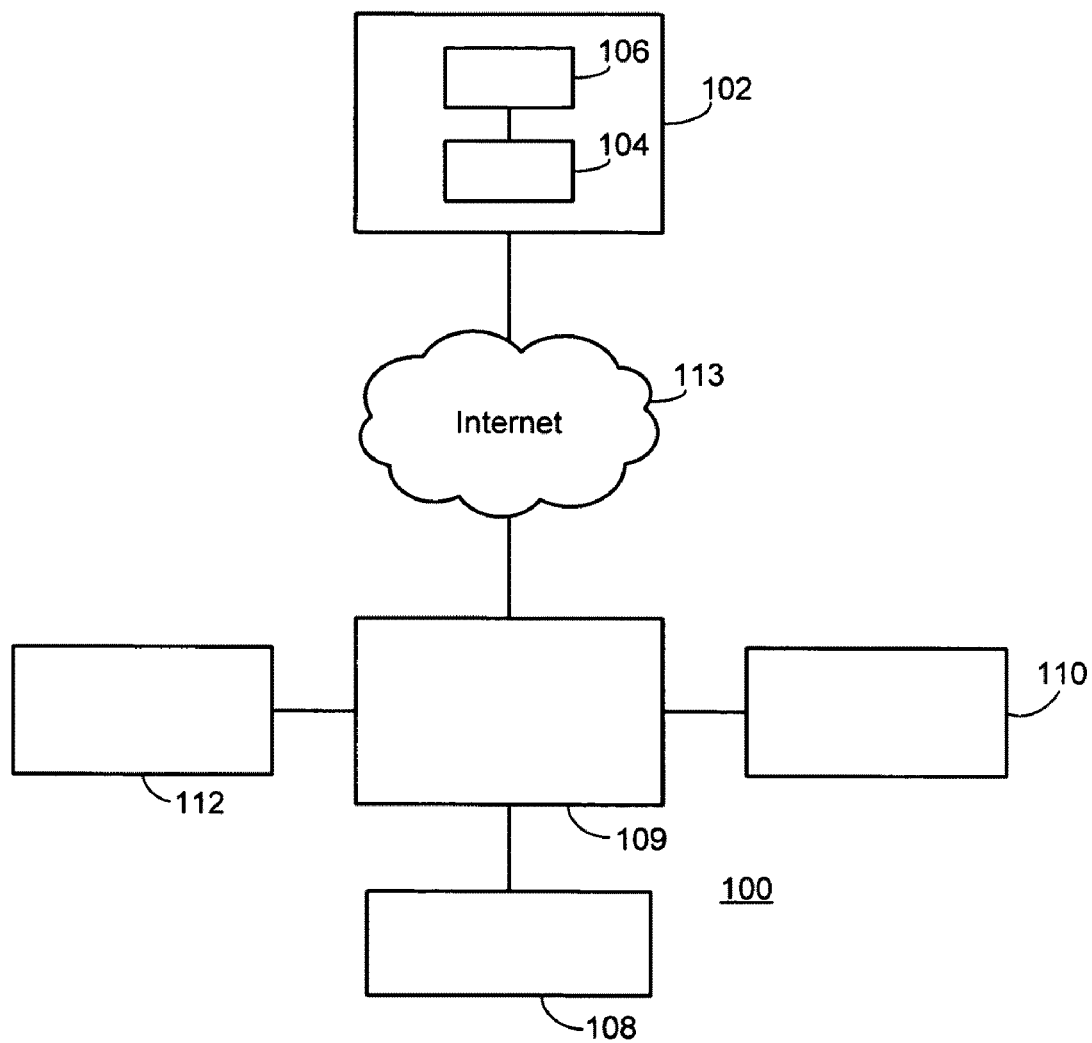
FIG. 16 schematically shows a second embodiment of an individual productivity and utilization tracking system in accordance with the present invention.

As shown in FIG. 16, a laptop computer 109 may be connected to the finance processor 102 via the Internet 113. Thus, the finance processor 102 can be located at a different site than where the laptop computer 109 is located. This allows for flexibility in conducting the evaluation process. Of course, it is possible to have the laptop computer 109 directly connected to the finance processor 102 via a hardwire connection. In another alternative, the finance processor 102 is incorporated in the computer hardware system itself. A display 110 and a printer 112 can be electrically connected to or form part of the laptop computer 109.

In general for the productivity and utilization systems 100 of FIGS. 1 and 16, once data is input into the microprocessor 104, the finance program takes the data and places the data in the database in memory 106. Note that the data entered by each user is captured in an Excel file associated with the user that entered the data. On a regular basis, such as in a daily manner, an Excel macro program is run so as to open each user's Excel file and write the data to a common table in the memory 106 so that the data from all of the users can be aggregated. The contents of the database can be observed via the visual display 110 or can be printed out via the printer 112. Note that while the above description describes how to generate a graphical user interface via Excel, there are obviously other ways to generate a graphical user interface.

With the above mentioned structure of the productivity and utilization systems 100 of FIGS. 1 and 16, operation of the productivity and utilization systems 100 will be described hereinafter. In particular, examples of tasks performed by the finance programs of FIGS. 1 and 16 are described hereinafter with respect to the discussions below with respect to FIGS. 2-15. Furthermore, while readily apparent from the disclosure of FIGS. 2-15, data used, generated and/or displayed by the productivity and utilization systems 100 of FIGS. 1 and 16 is stored in memory 106.

Figure 2:
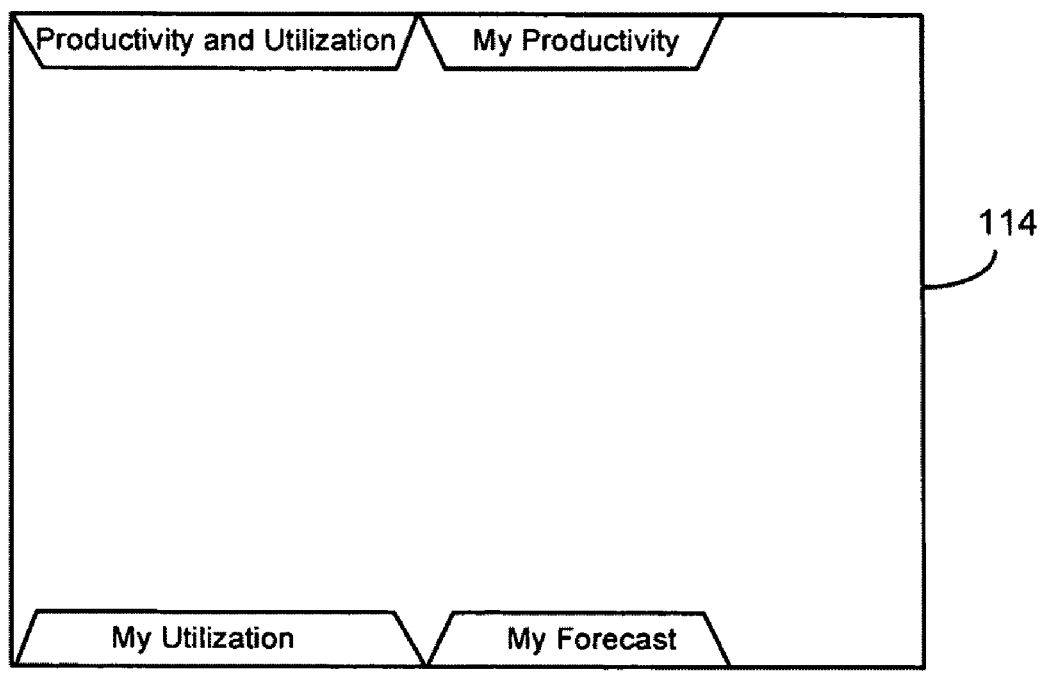
FIG. 2 shows an embodiment of a home screen that can be displayed by the individual productivity and utilization tracking systems of FIGS. 1 and 16.

As shown in FIG. 2, the productivity and utilization systems 100 of FIGS. 1 and 16 are activated by an employee of an organization, such as a manufacturing business, so that a productivity and utilization software is implemented. Such software can be based on the Excel program sold by Microsoft. When the systems 100 are activated, a home screen 114 is displayed on visual displays 110 of FIGS. 1 and 16. As shown in FIG. 2, the screen 114 includes tabs labeled as follows: 1) Productivity and Utilization Tracking Tool, 2) myProductivity, 3) myUtilization, 4) myForecast.

When the employee clicks on the Productivity and Utilization Tracking Tool Tab via input device 108, the employee will have access to a file that contains shared documents that include a document for each individual team for a particular month. The employee chooses the document for his or her team for a month to enter productivity and utilization information. Once the employee's document is chosen, a tab labeled "Productivity Tracking Worksheet" with the employee's name is clicked on so that a "Productivity and Utilization Tracking Tool" screen 116 pops up on visual display 110.

As shown in FIG. 3, the screen 116 shown on visual displays 110 of FIGS. 1 and 16 sets forth various fields (unshaded cells) to be filled in by the user, such as an employee of an organization, such as a manufacturing business, via input device 108 as to the project details such as name of the individual, date, description of a task performed by the individual on the date entered, regular hours performed on the task on the date entered, overtime hours performed on the task on the date entered, the client/contract associated with the description of the task entered, the quantity of units associated with the task entered that are processed during the regular or overtime hours entered, and the quantity of units associated with the task entered that are completed during the regular or overtime hours entered. One or more of the fields can be filled in before, during or after the task is performed, where appropriate.

An additional field that can be filled in is one associated with the description of the task. The additional field allows the user to flag when a task is associated with a correction or reworking, such as 1) a service not to specification where reworking is required, 2) a correction due to user error during processing and 3) paperwork received is incomplete and so additional time is used to request and add information regarding the incomplete paperwork. A second additional field can be filled in that identifies whether or not a task is non-transactional casework, such as 1) a special case due to research required for retroactive correction, 2) a legal case requiring a non-standard response, 3) a special non-standard project, such an annual periodic, and 4) a project, such as a quarterly audit. Such non-transactional casework frequently has lengthy cycle times.

Note that the ability to differentiate between "processing" and "completion" tasks aids in avoiding double counting the throughput of a process. This is critical when a direct time task and units completed are captured at one level and the units completed are part of a larger process and so such units would be counted as "processing" units. For example, assume that a process Z has three steps. An employee completing step 1 within one hour will enter the number of units completed during that step, such as 100 units, and enter the time to complete the step. That same employee or another employee performing step 2 will enter 100 units for step 2 and will enter the time to complete the task, such as one hour. Likewise, 100 units and the time of completion, such as one hour, will be entered when step 3 is completed. For the above described overall process Z, it is essential for the system to not aggregate the numbers from steps 1-3 to come up with 300 units completed. Instead, system 100 needs to recognize that 100 units have been completed. While the combined time, three hours, must be aggregated against process Z, the quantity processed at each step should not be aggregated. To solve this issue, only one process step is designated as a completion step. This prevents double- or triple-counting of the quantities being processed in the work in process steps. Finally, the systems 100 of FIGS. 1 and 16 can calculate that process Z has a productive hour productivity of 33.3 (100 units completed in three hours).

As mentioned above, the systems 100 of FIGS. 1 and 16 are able to distinguish processes and sub-processes from one another and assign attributes to each, such as designating as a completion task, service line, process category, team, points, sub-team name, time category, action-type, label, etc. Such information can be stored in a look-up table in memory The client-contract column/field of the screen 116 of FIG. 3 allows for the particular client and/or contract to be entered from a drop down menu. This allows for discerning when an employee to works the same task for different clients/contracts. Preferably, a default client/contract will appear in the field and can be changed via the drop down menu.

The description of the task may include information identifying a particular service line that can perform the task. In addition, an identifier can be added to a task description that identifies unique tasks.

The description of the task may include direct tasks and indirect tasks, wherein a direct task is a task that is billable and can be quantified in numbers, e.g., volume, and an indirect task is a business related task that is not billable and is a task that needs to be performed to enable service delivery. The tasks can be categorized further. For example, the indirect tasks can be categorized as either client funded or non-client funded. Client funded indirect tasks are indirect tasks that are required by a client explicitly but cannot be accounted in terms of volume, e.g., ad hoc reports, project work, client sponsored process improvement initiative. Non-client funded indirect tasks are indirect tasks not required by the client but are necessary to maintain a healthy work environment, such as performance appraisals, leave, community initiatives.

Figure 5A:
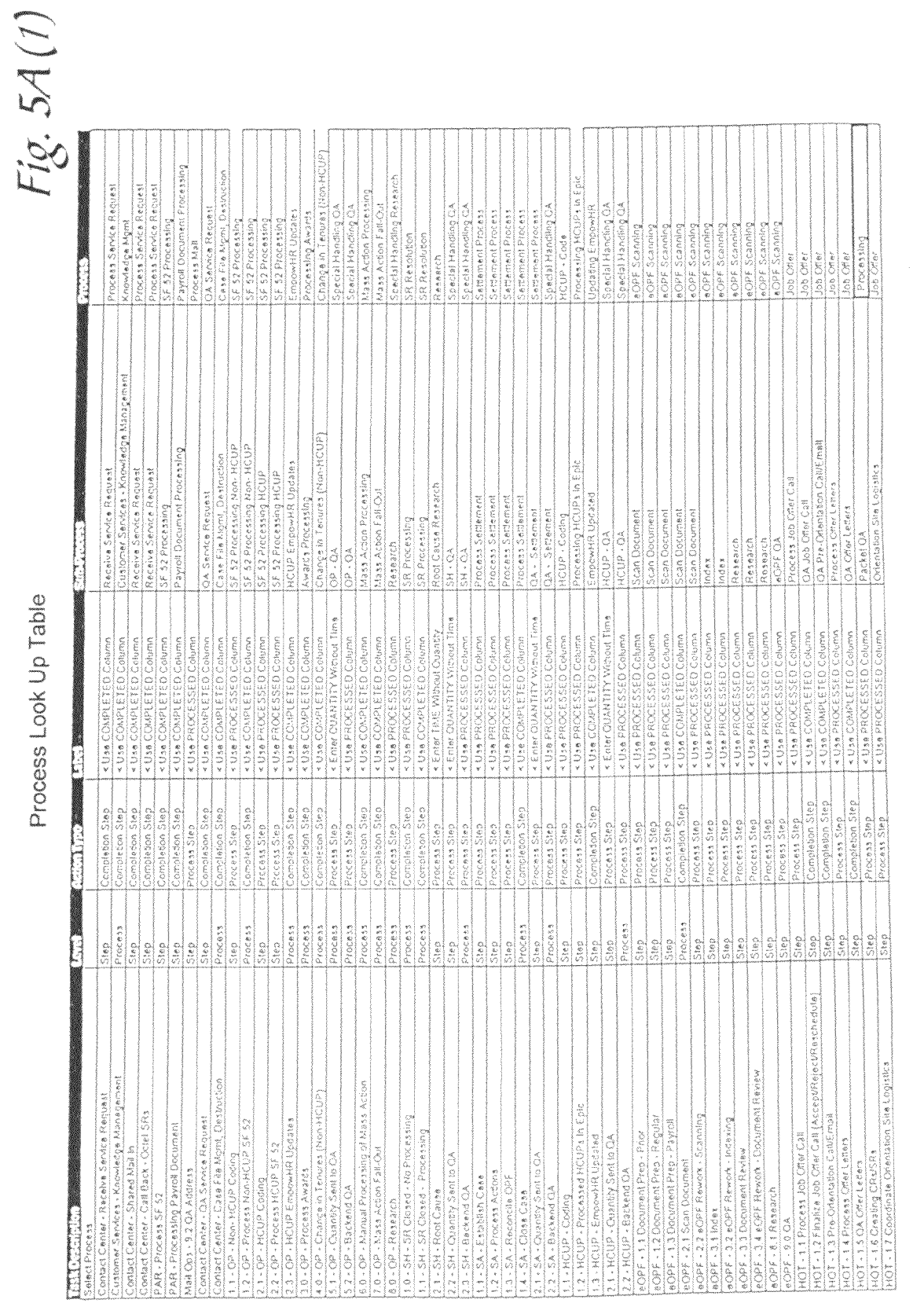

Other examples of indirect tasks would be breaks, CIO support, contractor time off, records task, meetings, metric reporting, productivity tracking, training personal development, training and workflow. Further examples of indirect tasks are shown in FIG. 4. Similarly, further examples of direct tasks are shown in FIGS. 5A(1)-5D(2). Note that FIGS. 5A(1)-5D(2) shows a look-up table stored in memories 106 of the systems 100 of FIGS. 1 and 16 that include task descriptions, levels, action type, label, sub-process, process, sub-team name, team, points, process category and service line. Other information regarding tasks that can be included in one or more look-up tables are reference numbers, service components and elements and their descriptions, responsibilities and tasks for the tool. Note that each of the drawing pairs FIGS. 5A(1)-(2), 5B(1)-(2), 5C(1)-(2) and 5D(1)-(2) are to be viewed side-by-side.

As shown in FIG. 3, the direct tasks would be entered by clicking on one of the items labeled "Select Process." A pull down list of direct tasks is shown and the employee selects the appropriate task. In a similar manner, an indirect task is entered by clicking on one of the items labeled "Select Indirect Category" so that a pull down list of indirect tasks is shown so that the appropriate indirect task is chosen.

After the direct or indirect task is selected, the other unshaded fields associated with the selected task can be filled in. Of course, the regular hours and overtime hours fields are filled in after the selected task is completed. A field for comments or notes is also provided to allow entry of facts of interest regarding the task that is completed. Such comments may be used to identify causes of inefficiency, determine reasons for variances in the process and access the scope, frequency and duration of the causes of variation.

As shown by the description above, the systems 100 of FIGS. 1 and 16 limit the types of information that the employee can enter, such as hours, quantities and comments. For most other fields, drop down menus are employed so that standardized entries are made available to the employee. Such drop down menus are generated via look-up tables stored in memories 106 of FIGS. 1 and 16. Such look-up tables could include standardized entries for client names, indirect tasks with corresponding process names (should map to a SIPOC), process steps. Furthermore, look-up tables could be established that include names of employees, their corresponding internal enterprise identification and their corresponding project they work on. Also, look-up tables that include employee information that regard his or her service line, whether multiple service lines are worked, location, status, position, future hire reason, geography, team name, task type, process step or completion step, point value for the process if weighted for performance management. A look-up table for managers can be established that includes the name of the manager, the manager's role, whether has multiple roles, % of time in role and service line % dedicated, work location, city, country, contract and levels. By tying the employee and manager with the various information via look-up tables, it is possible to generate productivity reports and the like that can be grouped by geography, location, service line, team name, etc.

After the regular hours/overtime hours and quantity processed/completed for a particular task description are entered by the employee, the hours and quantities are taken from memory 106 and sent to microprocessor 104, wherein a calculation is performed so that total daily hours and daily utilization rates are generated and displayed in the corresponding "Total Daily Hours" and "Daily Util Rate" cells of screen 116 shown in FIG. 3. The total daily hours and daily utilization rates are calculated in a well known manner (see for example the previously mentioned 3-step process Z example).

Besides calculating daily hours and daily utilization rates, screen 116 of FIG. 3 can convey other information. For example, a "Click Here for Help" area allows a user access to a user job aid. A Word document is now maintained separately where it can be accessed and updated as needed enabling updates to be visible to users in real time. This link opens in a separate browser window for the benefit of users with questions. Answers to FAQs can be included.

A "% of Target" column can be displayed where an expected productive hour productivity number (expected number of units completed per hour) per task will be assigned for an employee. After the employee selects a task, enter hours worked and enter a quantity, when fully enabled, the tool will evaluate the actual rate against the expected rate and return a percentage of target to the user. Variation in excess (positive or negative) of 30% from the target rate will result in the cell turning yellow for negative and green for positive. This condition will prompt users to add two pieces of information: 1) select CCV (common cause variation) or SCV (special cause variation) and 2) enter a comment or explanation.

An employee should select CCV when the reason for being off target is essentially a result of normal variation and there is no identifiable reason why it should have taken more or less time. It is understood that with any assignment there are some "cases" or activities which are more difficult than others, but they are all lumped into the same task. Comments from users help us better understand the complexity of the work and provide insight into opportunities to improve processes.

Users should select SCV when the reason for being off target is a result of a special event or occurrence, which is outside the norm. Examples include, 1) getting a batch of work which is particularly difficult because it is older or otherwise unique, 2) a new person executing the process who is not fully ramped up and comfortable, 3) slow or delayed response times from web-based systems and tools which prevent normally quick processing, 4) a task which was performed that didn't quite fit the task that was selected but used anyway because of its similarity, etc. Examples are infinite. Comments from users related to SCV are particularly valuable because they help us identify process deficiencies which potentially threaten our service delivery commitments to clients. These are important opportunities for process improvement.

Another area that can be added to screen 116 is "% of Target—Comment or Explanation (Explain Cause of Productivity Variation)" column. This is a free-form text field where users can enter a brief comment to explain the root cause associated with their CCV or SCV selection. It is recommended that when productivity variance exceeds 30% (positive or negative), that users request from their supervisor, what comment might be appropriate so that when reporting is done later, the variation is clearly explainable. If more than one person is working on the task with the same variation root cause, the supervisor will likely suggest that the comment be the same for consistent reporting. Users may elect (and are encouraged) to enter a comment even when this functionality is not enabled because users comments are essential to provide better explanation for and visibility into reasons for productivity variation. Note that the systems 100 of FIGS. 1 and 16 have the capability of flagging variance to the employee based on 1) a percentage off target, 2) deviation from the upper and lower control limits or 3) deviation from customer defined upper and lower specifications.

The screen 116 can include a "Client Funded Percentage Pie Chart" that updates in real time as users select information based on tasks which fall into three categories:

1. Client Funded Direct—production activities which are the core of our service delivery to clients
2. Client Funded Indirect—non-production activities which are essential to service delivery and paid for by the client
3. Non-Client Funded—non-production activities which are typically Accenture-specific and not paid for by the client Other pie charts can be shown on screen 116 as listed below:

1. A "Utilization Percentage Pie Chart" can provide the Updated Utilization Calculations Utilization=(Client Funded Direct+Client Funded Indirect)/Total Time Worked     a.

Total Time Worked=(Client Funded Direct+Client Funded Indirect)+(Non-client Funded Indirect–Non-client Funded Indirect Time Off (Paid Time Off and Holidays))     b.

2. A MTD Utilization pie chart that represents the percentage of total time applied to production activities (Client Funded Direct).

3. An Hours Toward Key Initiatives pie chart serves as visual management to provide feedback to users relative to two frequently overlooked areas: training and process improvement. The chart values auto-update in real time. The total represents the total hours applied to each category. Training hours include all types of training. The cell will remain yellow as a reminder until the value exceeds 2. Process improvement is specifically time applied to working on continuous improvement initiatives or with continuous improvement teams. The cell will remained yellow as a reminder until the value exceeds 2.

Besides automatically calculating total daily hours and daily utilization rates, the productivity and utilization systems 100 of FIGS. 1 and 16 are able to perform other calculations and present reports that are relevant to productivity and utilization of employees of the organization. For example, the cost of processing and completing units can be determined by multiplying the units processed or completed by the number of hours worked to process or complete the units and by the labor rate of the individual that worked to process/complete the units. Due to the sensitive nature of labor rates, such rates are only accessible to certain authorized individuals that are entrusted in generating reports regarding the cost of processing and completing units.

Product costs based on task-based data should also include at least one of the following three sets of data: 1) labor level and standard loaded labor rate, 2) enterprise ID of employee, level of employee and standard loaded labor rate and 3) enterprise ID of employee, level of employee, standard task level, standard loaded labor rate and actual loaded labor rate. Other parameters that can be tracked for product cost calculation reasons are: 1) standard time, 2) time variation, 3) standard productive hour productivity rate, 4) productivity variation, 5) productivity variation cause, 6) productivity variation comment, 7) standard level, 8) actual level, 9) labor rate variation, 10) standard cost, 11) actual cost, 12) overtime cost variation, 13) monthly production (client demand) by process by day, 14) units completed per paid and productive hour, 15) unit cost when used with labor data, 16) processing time viability, 17) process cycle efficiency, 18) direct labor applied to tasks which are common to multiple value streams and 19) changes in the intentional and unintentional characterization of work. Obviously, a more detailed cost analysis is possible by using more cost-related parameters. Also, the cost analysis can be broken down as to service line, process, sub-process and productive task, for example. Note that if a task is comprised of a series of steps and the steps are performed by different operators, in different locations or at different times, there is a need for task-level differentiation for the purpose of time accumulation so that productivity by a person by task by day can be analyzed.

The employee can generate a report regarding his or her productivity via the productivity and utilization systems 100 of FIGS. 1 and 16. This is accomplished by having the user click, via input device 108, on the myProductivity tab on the home screen 114 of FIG. 2. Clicking on the myProductivity tab results in a productivity screen 118 being shown on visual display 110. As shown in FIGS. 6A-B, the productivity screen 118 includes a drop down menu under "Task Description" that lists possible direct and indirect tasks which an employee may be responsible for. The employee clicks one of the boxes in the menu that correspond to a task to which the employee actually responsible for. Clicking on the "OK" button results in three events happening: 1) the selection of the task corresponding to the checked box, 2) a pivot table automatically tracks the employee's personal productive hour productivity for the selected task for each month and 3) the drop down menu is removed.

The productivity screen 118 also allows the employee to click on the "date" button so that the production of the employee for a particular month can be viewed on the screen. As shown in FIG. 6, the month of January is displayed with the total hours worked each day by the employee based on one of the tasks previously selected shown below the corresponding day.

Note that the calculation of the paid hour productivity may include such information as 1) the indirect tasks to which time is applied by the employee, 2) the actual time applied to the indirect tasks, 3) the direct tasks over which the sum of the indirect time must be distributed, 4) the percentage of the sum of the indirect time which must be distributed to each direct task and 5) the capability of distributing indirect time across multiple direct (productive) processes for team members allocating tome to multiple processes daily.

As an example of the capability of the systems 100 of FIGS. 1 and 16 for distributing indirect time across multiple direct processes: if an employee's responsibility is to produce widgets and the employee works for five hours and produce 500 completed widgets, the employee's productive hour productivity is 100 per hour. However, if the employee was paid for an eight hour day, the employee's paid hour productivity would be equivalent to 500 units completed divided by eight hours (500/8=62.5). This is a relatively simple calculation when there is only one productive task. If the employee had worked on three productive tasks however and distributed five hours across them at a rate of one hour, two hours and three hours, respectively, the appropriate method of distributing the additional three paid hours is in proportion to the time spent on the three productive tasks (20%, 40% and 60% respectively or 0.6 hours, 1.2 hours and 1.8 hours respectively). This clearly affects the paid hour productivity at the task level. The systems 100 of FIGS. 1 and 16 automatically adjust the daily percentage of distributed time for productive tasks in order to create an allocation model for the sum of the indirect time, which will be distributed across the direct tasks proportionately.

While the previous discussion describes how an employee is able to view his or her personal production, the employee's production data can be combined with the production data of other employees. For example, it is contemplated that the manager of a team that includes one or more employees will have a managerial productivity and utilization tracking system 200 that is in direct or indirect communication with each of the productivity and utilization tracking systems 100 of the employees of the team. In one embodiment shown in FIG. 7A, the managerial productivity and utilization tracking system 200 is in direct communication with the productivity and utilization tracking systems 100 of FIGS. 1 and 16. Such communication can be either a hard wire or a wireless connection. The manager will be able to initiate a process at system 200 that will cause the productivity data of the team members to be sent to the memory 106 of system 200, wherein microprocessor 104 of system 200 performs calculations on the data periodically, such as daily, by using a supplemental Microsoft Excel worksheet with auto-updates, pivot tables, charts and graphs. Thus, various reports can be generated so as to be shown on visual display 110 of system 200. The reports can also be printed via printer 112 of system 200. Note that the reports can include reports regarding a particular process or sub-process, a productive task, an employee and a date.

Figure 7A:
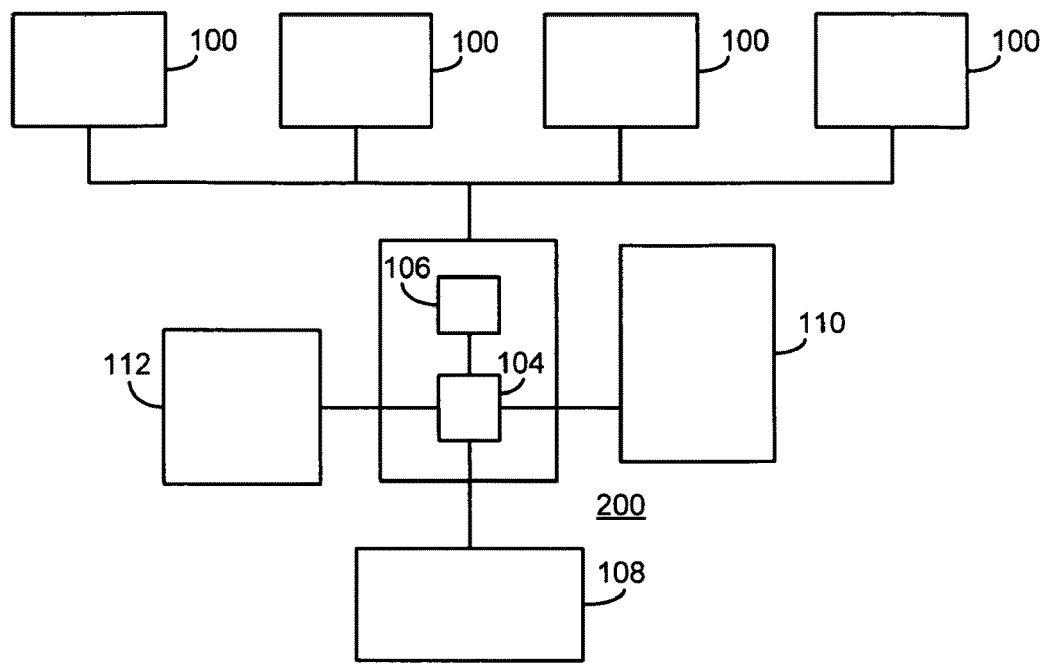
FIGS. 7A-B show two alternative embodiments of tracking systems that incorporate one or more of the individual productivity and utilization tracking systems of FIGS. 1 and 16 and an embodiment of a managerial productivity and utilization tracking system.
Figure 7B:
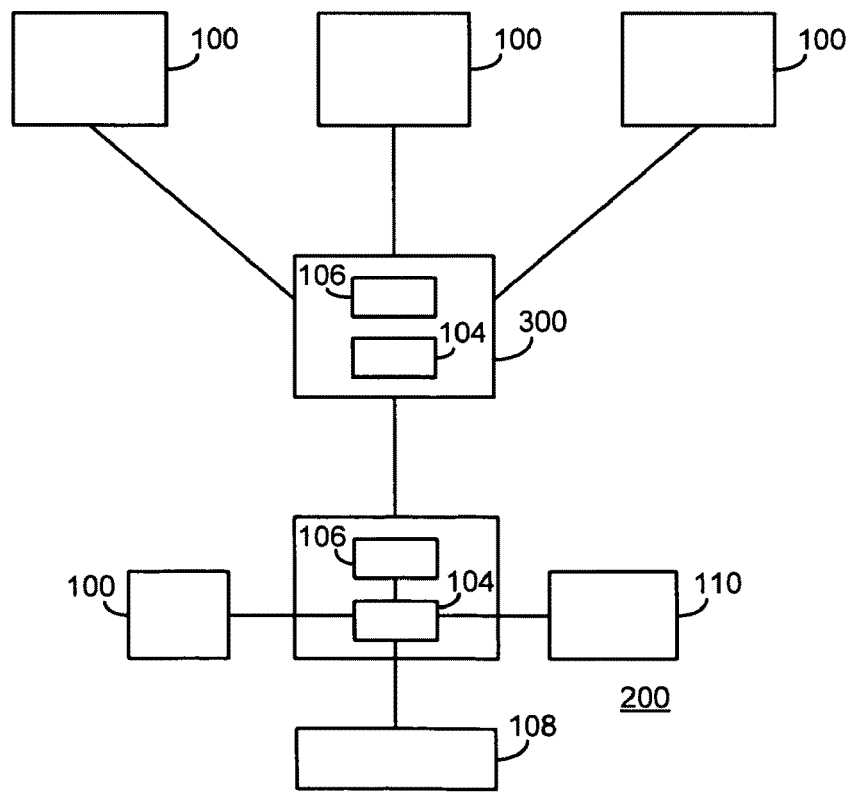

In another embodiment shown in FIG. 7B, the data from systems 100 of FIGS. 1 and 16 is sent off site to a central processing system 300 that includes a memory 106 and microprocessor 104. The microprocessor 104 of system 300 makes calculations periodically, such as daily, by using a supplemental Microsoft Excel worksheet with auto-updates, pivot tables, charts and graphs. Thus, various reports can be generated so as to be shown on display 110 of managerial productivity and utilization tracking system 200. The reports can also be printed via printer 112 of system 200. Note that communication between systems 100, 200 and 300 can be via hardwire connections, wireless connections or combinations thereof.

In either of the embodiments of FIGS. 7A-B, the manager will be able to initiate a process that will cause the productivity data of the team members to be processed into usable reports and graphs shown on visual display 110 of system 200. From such information, the manager will be able to evaluate the productivity of the team.

Figure 9:
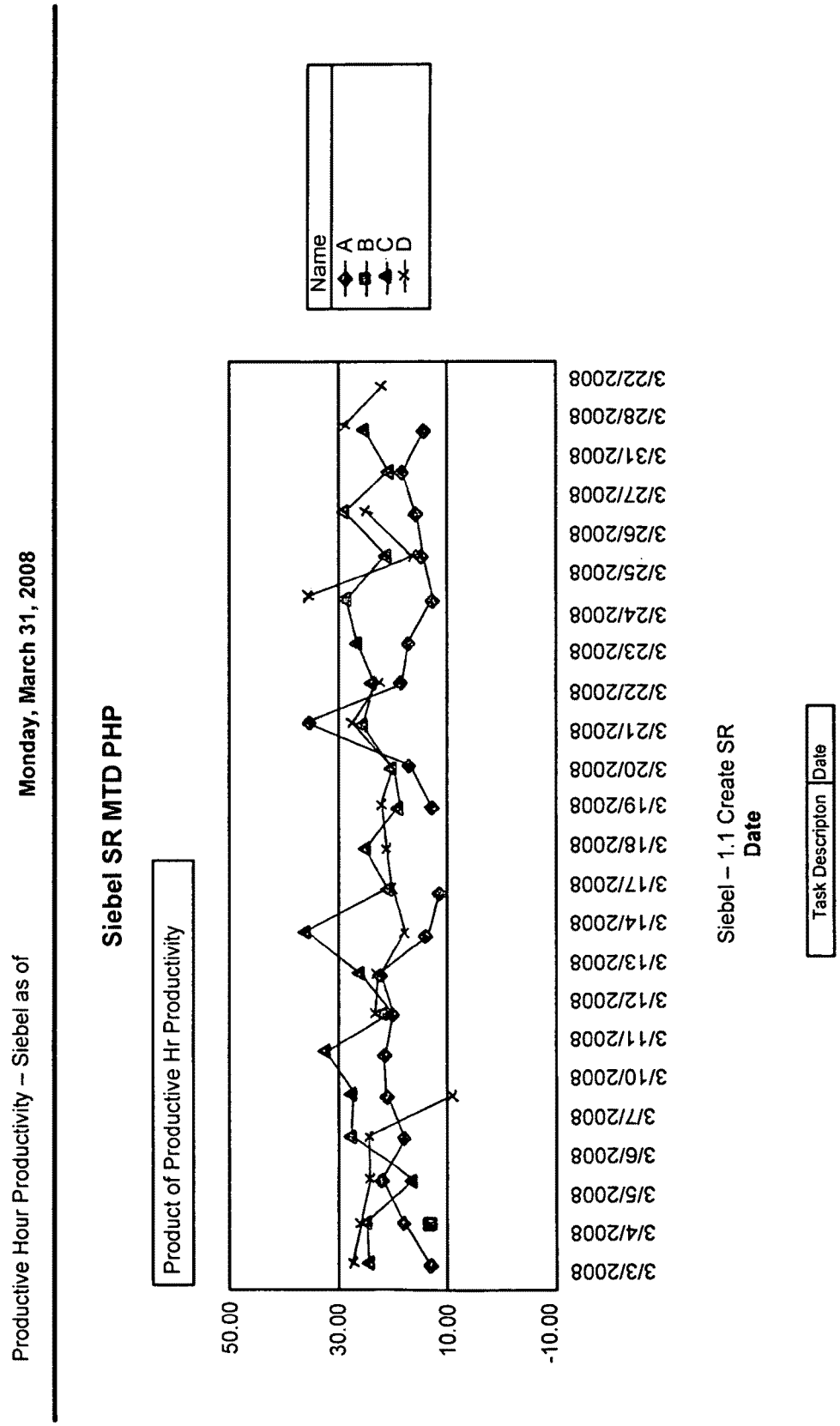
FIG. 9 shows an embodiment of a monthly productive hour productivity graph generated by the managerial productivity and utilization tracking systems of FIGS. 7A-B in part by data displayed on the productivity screen of FIG. 6.

An example of a monthly productive hour productivity report generated from the combining of data described previously is the report shown in FIGS. 8A-C. The table includes columns for task, date and the productive hour productivity of an employee (A, B, C, D, E, F, G or H in FIG. 7A) for a task, wherein the productive hour productivity for a particular time period, such as a day, is the total units divided by the number of productive hours in such a time period. The total units are defined to be the total number of productive units (output volume) processed by a specific process by an individual team. An average productive hour productivity for the day's work that was actually performed for a task is calculated offsite. A graph can also be generated for each task that shows the productive hour productivity for each employee in a team as shown in FIG. 9.

Another productivity table that can be generated from the combined productivity data of the employees is shown in FIGS. 10A-B. The table breaks down for a particular team of employees the total daily hours worked in a time period, such as a month, the sum of total quantity processed and productive hour productivity for each process, sub-process and task. Note that the numbers in shade are automatically calculated by microprocessor 104 of system 200 of the embodiment of FIG. 7A or by the microprocessor 104 of system 300 of the embodiment of FIG. 7B from the productivity data entered in the productivity and utilization systems 100 of the employees of the team.

Another productivity table that can be generated from the combined productivity data of the employees is shown in FIGS. 11A-B. The table breaks down for a particular team of employees the total indirect daily hours worked each day during a time period, such as a month. A grand total is calculated for each day for each team member.

Figure 12:
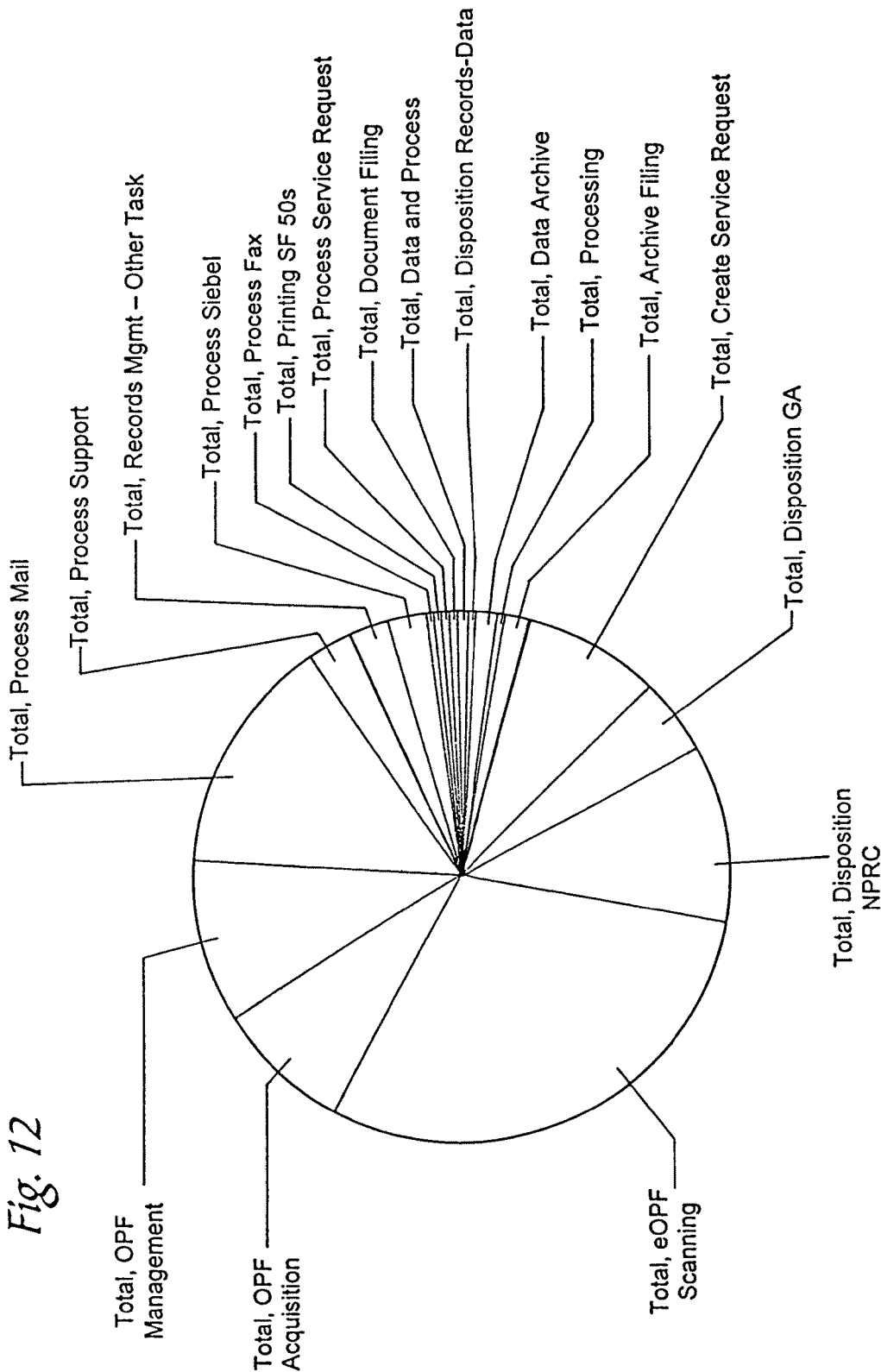
FIG. 12 shows an embodiment of a pie chart showing the distribution of direct tasks during a time period that is generated by the managerial productivity and utilization tracking systems of FIGS. 7A-B in part by data displayed the productivity screen of FIG. 6.

Another productivity report that can be generated from the combined productivity data of the employees is shown in FIG. 12. In particular, a pie chart showing the distribution of direct tasks during a time period, such as a month, is generated by the managerial productivity and utilization tracking systems 200 of FIGS. 7A-B. Note that the tables of FIGS. 8A-C, 10 and 11A-B and the graphs/charts of FIGS. 9 and 12 can be shown on visual display 110 of system 200 of either of the embodiments of FIGS. 7A-B.

Note that other reports/graphs/charts can be generated by the systems of FIGS. 7A-B by analyzing other production parameters, such as paid hour productivity, total cost, unit cost and total units. Total units are defined to be the total number of productive units (output volume) processed for a specific process, by an individual team during a given time period, such as a month. Total cost is the total loaded payroll cost for a given time period, such as a month, charged against a specific process. Unit cost is the total cost divided by the total units for a given time period. Paid hour productivity is defined as the total units divided by the total paid hours in a given time period, such as a month.

The employee can generate a report regarding his or her utilization via the productivity and utilization systems 100 of FIGS. 1 and 16. This is accomplished by having the user click on the myUtilization tab on the home screen 114 of FIG. 2.

Figure 13:
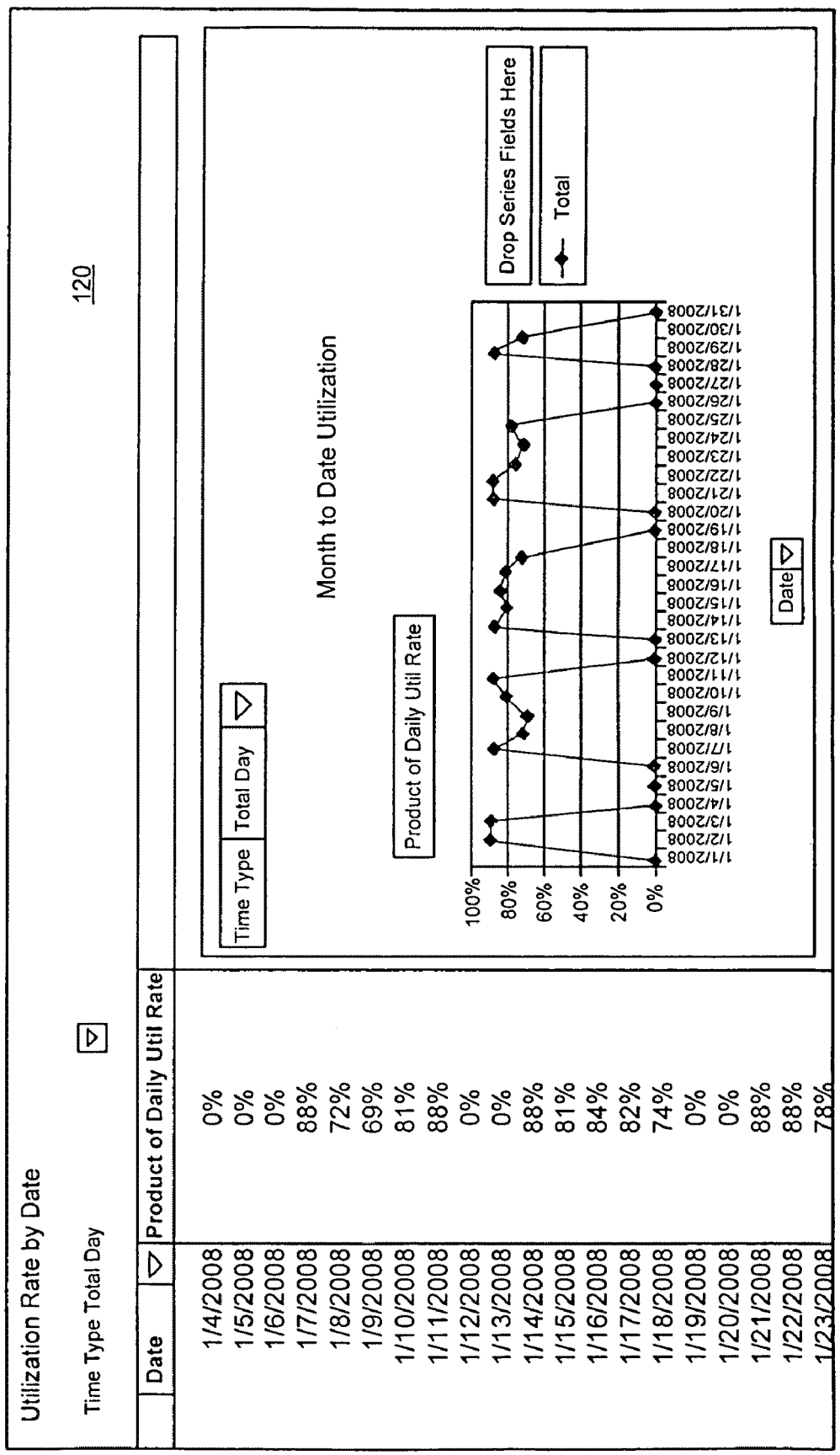
FIG. 13 shows an embodiment of a utilization screen that can be displayed by the individual productivity and utilization tracking systems of FIGS. 1 and 16.

Clicking on the myUtilization tab results in a utilization screen 120 being shown on display 110. As shown in FIG. 13, the utilization screen 120 shows a table and graph showing the utilization rate calculated for each day of a particular month, wherein the utilization rate determines the actual percentage of hours available to perform work tasks. The utilization rate for a particular time frame, such as a day, is calculated by the microprocessor 104 and is defined to be the total productive hours during the time frame divided by the total paid hours during the time frame. The total productive hours is the total number of actual productive hours charged by members of a specific team against a specific process. The total paid hours is the total number of actual hours charged to a specific product code by members of a specific team against a specific process. When the data rows are exported from the data collection tool, not all rows are equal. Some rows are individual time entries per day. Some rows have data with daily totals. Some rows are header rows. Some rows are monthly total rows. The rows are identified by the field Time Type so that reporting can be done on multiple levels.

Note that the calculation of the utilization for an employee may include: 1) calculating the sum of the time applied to direct tasks each day (total direct time), 2) calculating the sum of the time applied to indirect tasks each day (total indirect time), 3) automatically calculating the sum of the total direct time and the total indirect time (total time) and 4) automatically calculating the result of the total direct time being divided by the total time.

Note that many other productivity and utilization calculations are possible, such as 1) the percentage of working hours spent on client funded direct tasks, 2) the percentage of working hours spent on client funded indirect tasks, and 3) the percentage of working hours spent on non-client funded tasks (excluding hours on leave).

The employee's utilization data can be combined with the utilization data of other employees via the systems shown in FIGS. 7A-B. The manager initiates a process that causes the utilization data of the team members generated by systems 100 of FIGS. 1 and 16 to be sent to system 200 of FIG. 7A or system 300 of FIG. 7B where calculations are made periodically, such as daily, by using a supplemental Microsoft Excel worksheet with auto-updates, pivot tables, charts and graphs. As shown in FIG. 14, one possible report that can be generated is one that shows the average daily utilization rate of each team member for each day of a particular period of time, such as a month. From such information, the manager will be able to evaluate the utilization of the team.

In order to aid the manager and company in their financial forecasting, the system 100 gives the employee the ability to provide information regarding anticipated planned days off for the employee. For example, when the employee clicks on the myForecast Tab, a table as shown in FIG. 15 will be shown in on the display 110. The table sets forth dates, days of the week, standard hours, holiday hours and planned holiday hours ("myHours") for a particular time period, such as a month. The dates and days of the week can be changed by clicking on the corresponding headings. The employee only enters the number of hours he or she is planning on working for each day of the time period. The microprocessor 104 fills in the planned standard and holiday hours data based on the assumptions that: 1) the sum of standard hours and holiday hours for a particular day that an employee is scheduled to work is at least 8 hours (anything beyond 8 hours on regularly scheduled work days and any hours on non-scheduled work days will be considered to be overtime and which can be calculated and displayed for each day if desired and 2) any time entered for a non-scheduled work day is overtime and should go under the standard hours column. The data entered can be combined with similar data from other employees by using the systems of FIGS. 7A-B.

While the visual displays 110 of FIGS. 1 and 7A-B generate screens showing data regarding utilization and productivity, they can also be used to generate advice screens that present advice to the employee and manager. Such advice screens can be the screens showing the utilization and productivity data. For example, say an employee enters hours for direct tasks that are below goal, the screen can send a message to the employee reminding him or her that they are behind goal. Similarly, if the employee is using an inordinate amount of time on indirect tasks, a message can be generated on the screen to inform the employee of the situation. In addition, if the employee is spending a large amount of time on a non-critical project and the business needs another project to be completed in an expeditious manner, then a message can be sent recommending that the employee start working on the other project. Similar messages can be generated on the manager's screen in the visual display 110 of system 200 so that the manager is alerted as to whether particular projects are on schedule for completion or whether particular employees are having problems meeting productivity goals. The screen can also offer advice on how to address any problems that are identified on the screen. Furthermore, instructions regarding the data entry process can be obtained by moving a cursor over a functional area of the screen so that an explanation will pop up.

The invention may be embodied in other forms than those specifically disclosed herein without departing from its spirit or essential characteristics. For example, it is possible to replace the Excel presentation of data as described previously with respect to the systems 100 of FIGS. 1 and 16 with a web-based, scalable version that would provide for real-time reporting and comparison capabilities across service delivery centers and locations. The web-based version would have the data entered by all users sent directly to a table instead of using multiple Excel tables that have their data aggregated into a table via an Excel micro as described previously with respect to the embodiment of FIG. 1. It is preferred that the web-based, scalable version has at least the reporting and data acquisition capability of the systems 100 of FIGS. 1 and 16. Integration with a time keeping system, such as Accenture's ATRES system, is possible, the time keeping system can be embedded in the above described web-based version. In addition, more parameters can be used to fine tune the analysis, differentiating between regular and overtime hours, pay period week, sub-team identification, process category, service lines/service delivery units (such as employee benefits, payroll processing, employee services and call center operations), outsourcing group, capability offering, geography, region, delivery location and operating group. With the addition of more parameter, it would be possible to do the following calculations and analysis: 1) measuring individual performance against the "Speed of the Process", 2) managing utilization by person by team, 3) capacity planning and real-time line balancing decisions, 4) forecasting when there is a variation in capacity or demand, 5) measuring monthly production (client demand) trends by person by process by day, 6) calculating process cycle efficiency (total direct time divided by cycle time), 7) evaluating total time applied to tasks which are common to multiple value streams (complexity), 8) perform line-balancing decisions, 9) implement OpEx lean methods and 10) completing calculations needed for implementing workload leveling.

Figure 17A:
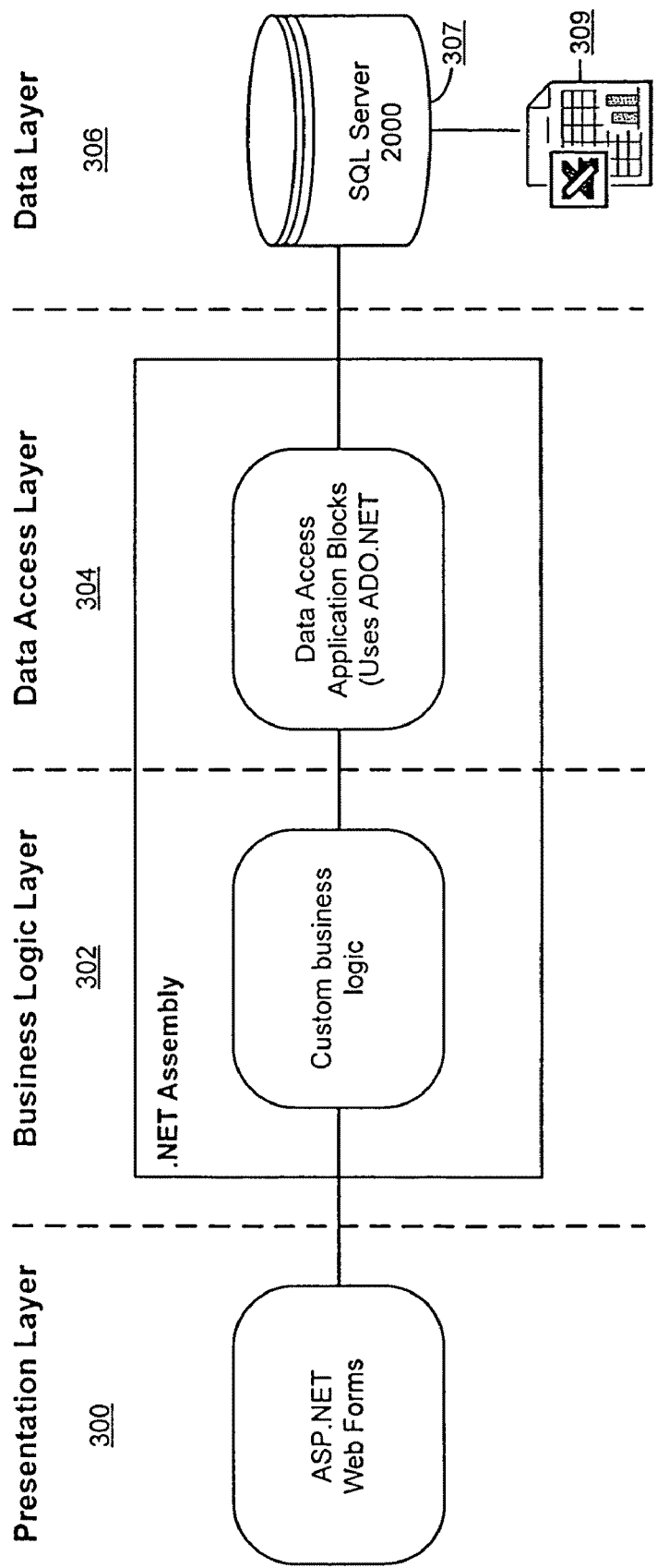
FIG. 17A schematically shows an embodiment of a web-based individual productivity and utilization tracking system in accordance with the present invention.
Figure 17B:
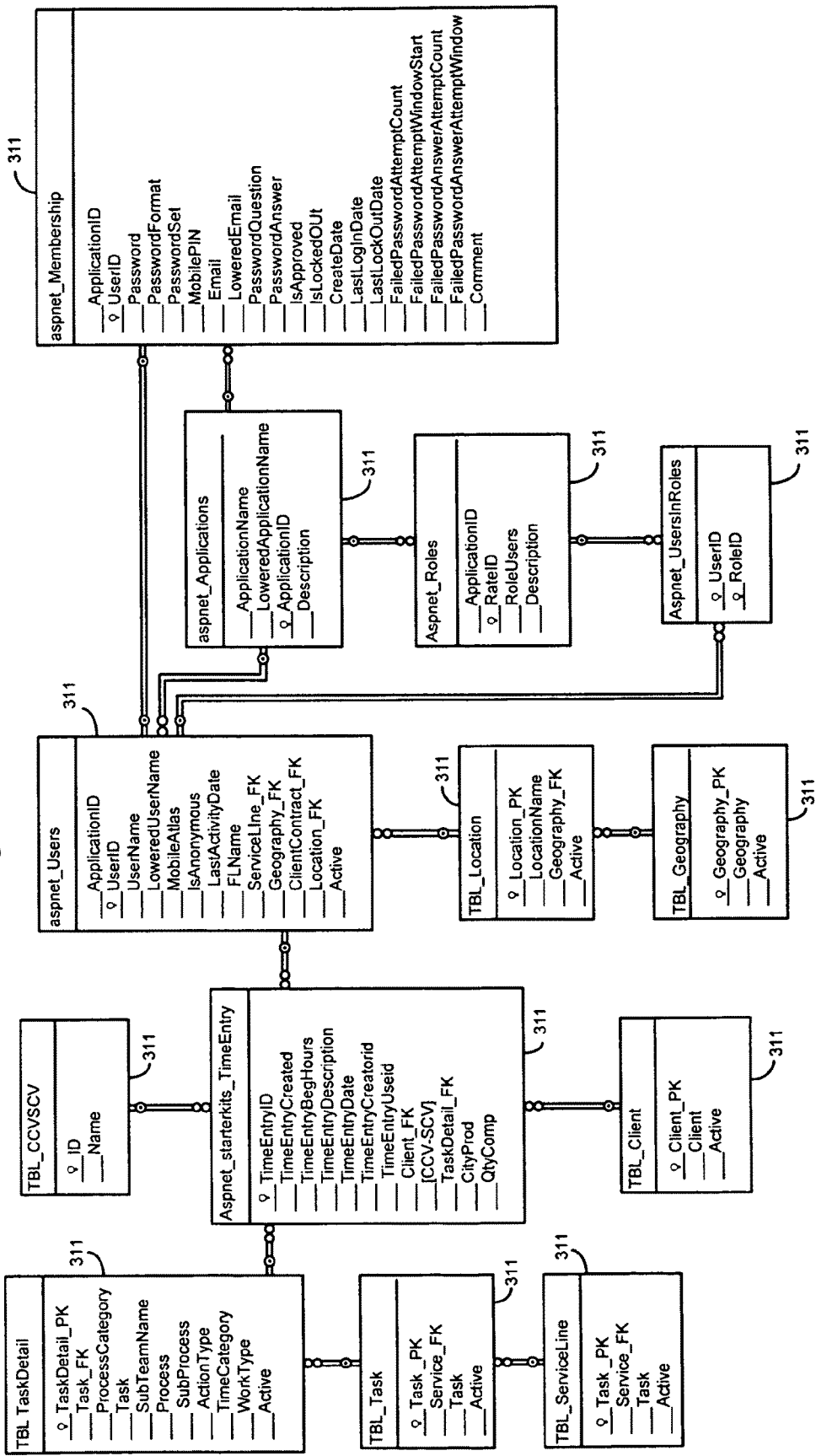
FIG. 17B schematically shows table relationships for tables storing raw data for the web-based individual productivity and utilization tracking system of FIG. 17A.

An example of the above mentioned web-based version of the present invention is shown in FIGS. 17A-23I. The web-based version can be implemented via the system 100 shown in FIG. 16. As shown in FIG. 17A, an embodiment of the web-based version of the present invention is schematically shown. The web-based version can be thought of as involving four layers. For example, the web-based version includes a presentation layer 300 in which a user is able to access user friendly forms in which to enter his or her time regarding a task. Once the time is entered, the time entries are processed via 1) a business logic associated with a business logic layer 302 and 2) a data access application associated with data access layer 304. Note that the business logic layer uses table relationships to translate the user input into meaningful information including: service lines, product categories within those service lines, types of time (billable vs. non-billable), client accounts, etc. and the layer also uses formulas to transform the raw data into calculated values which are necessary to generate business intelligence. An example of possible table relationships is shown in FIG. 17B. As shown in FIG. 17B, the raw data is organized into multiple tables 311 that regard such information as time entries, task detail, tasks, etc. The multiple tables are further organized into further categories corresponding to the raw data to be entered by the user.

In operation, the business logic interprets and processes the time entry in the manner described previously with respect to the systems 100 of FIGS. 1 and 16. Once the time entry is interpreted/processed is stored in a centralized database or data warehouse in a real-time manner. Such a database can be stored in memory associated with an SQL server 307 that is similar to memory 106 of the system 100 of FIG. 16.

As shown in FIG. 17A, a data layer 306 is employed in the form of the SQL server 307 into which the data stored in data access layer 304 is automatically replicated at least once a day. From the data present in data layer 306, Excel based reports in the form of pivot tables 309 are readily available online. Such reports are similar to the ones described previously with respect to the systems 100 of FIGS. 1 and 16.

Figure 18:
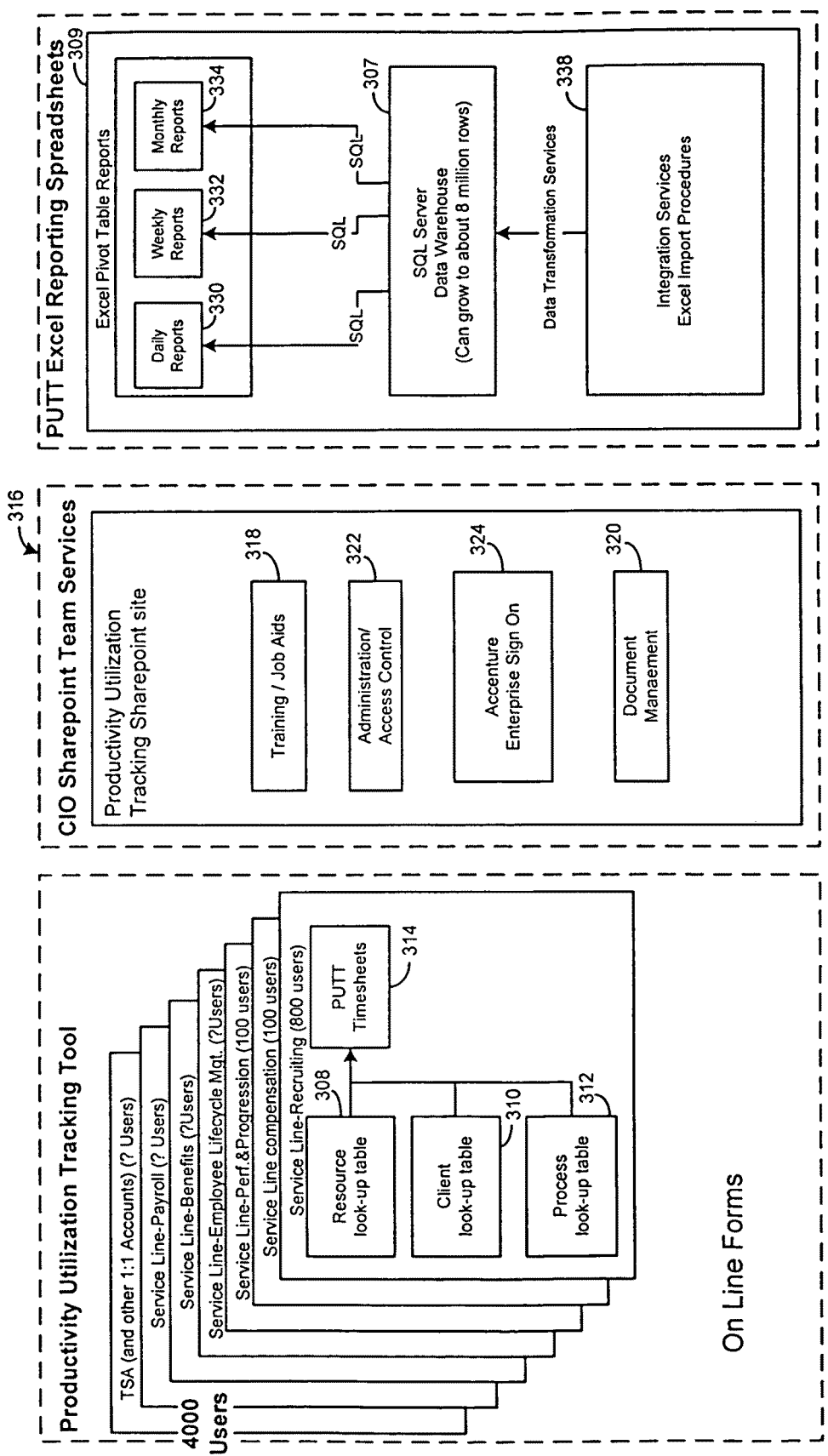
FIG. 18 schematically shows an architecture for implementing the web-based individual productivity and utilization tracking system of FIG. 17.

An example of architecture to run the web-based version of the present invention is shown in FIG. 18. In particular, the on-line forms associated with the presentation layer 300 are generated via a productivity utilization tracking tool software that includes for each segment of users (including service line recruiting and service line compensation): 1) resources look-up table 308, 2) client look-up table 310, 3) process look-up table 312 and 4) productivity utilization tracking tool time sheets 314. From the look-up tables 308; 310; 312 and 314, on-line forms 316 regarding such productivity factors as payroll, benefits, service-line employee lifecycle management, performance and progression, compensation and recruiting associated with a service line or user are generated and can be completed by users from all lines of service.

Note that in order to assist users in both data entry and reporting, an online hosted web-based environment 316, designated as Sharepoint, is accessible to users via a web browser. The environment assists the user by making available training/job aids 318, document management 320 and administration access control 322. Access to the environment is available via a sign on procedure 324.

Figure 19:
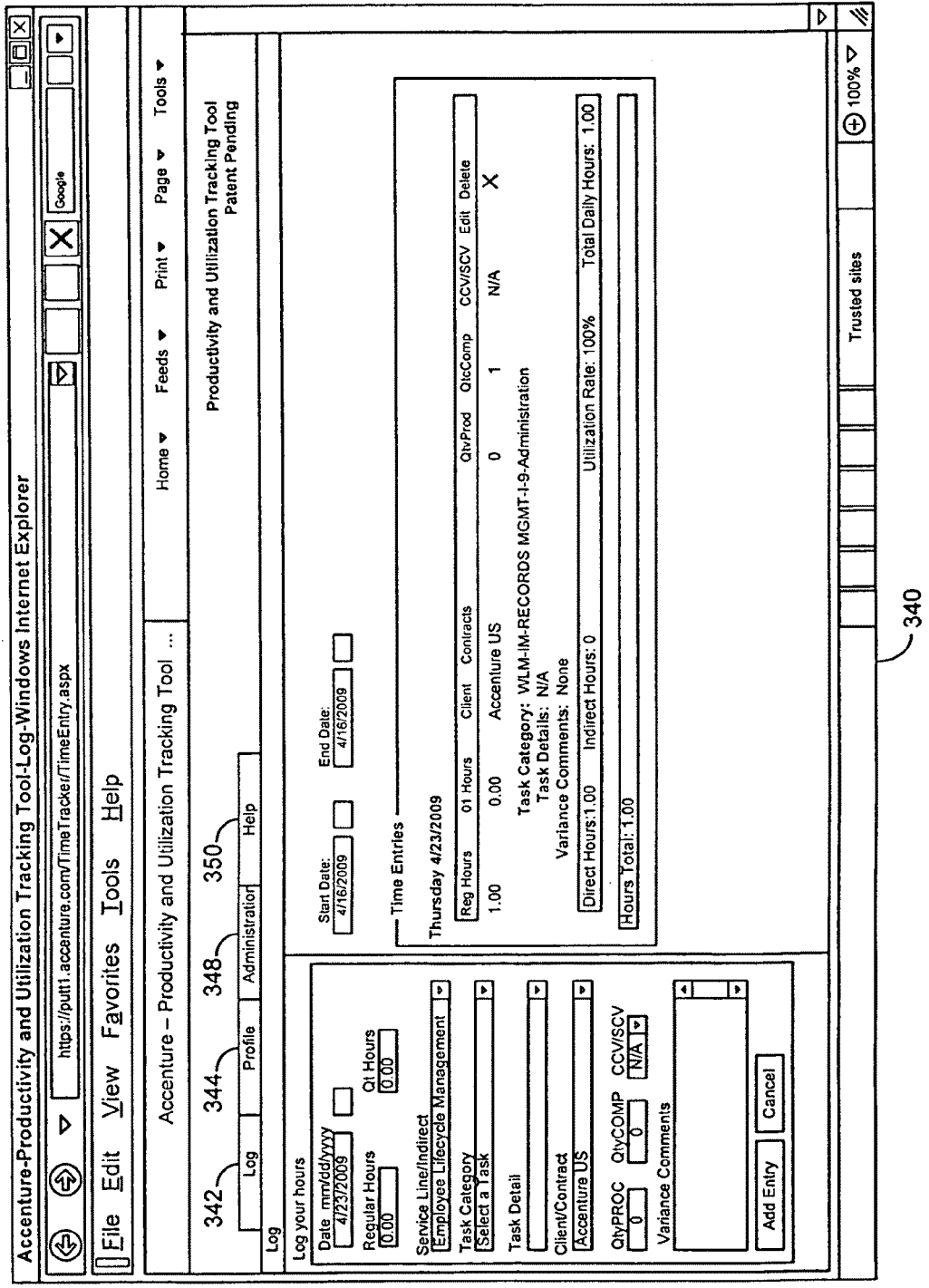
FIG. 19 shows an example of a data entry screen generated by the web-based individual productivity and utilization tracking system of FIGS. 17-18.

Based on the data generated, the data layer 306 is able to generated Excel pivot table reports that include daily, weekly and monthly reports 330, 332, 334. The SQL server 307 of data layer 306 implements integration services Excel import procedures 338. Note that the reporting of the reports 330, 332 and 334 can be done in an automatic manner in that the raw data stored in server 307 can be automatically extracted by the business logic layer 302 via OLAP technology which allows for the display of the data in the dimension specified by the users:

In operation, a user types in a web address at which the web-based tool of FIGS. 17A and 18 can be accessed by a user. A screen is displayed that asks for the user's name and password to gain access to the tool. The user inputs the information via input device 108 of FIG. 16. Assuming the password is accepted, then a user interface screen is displayed on visual display 110 of FIG. 16. The user interface screen may have several screens that can be accessed therefrom, such as a data entry screen, profile screen, administration screen and help screen. FIG. 19 shows an example of a data entry screen 340 that is accessed by clicking on the "Log" tab 342. The user then enters information regarding the date, regular hours and overtime hours (beyond 8 hours) worked on a task. The user also enables a drop down menu for a "Service line/Indirect" entry area so that a list of specific service lines associated with the task is generated. Note that indirect tasks are common across all service lines and are thus consolidated together as one listing. Once the user selects one of the specific service lines, it is displayed and it also reduces the options available in a "Task Category" entry area.

The "Task Category" entry area has a drop down menu with a listing of all tasks performed under the selected service line. The task being performed is selected by the user and displayed. Further details of the task can be entered via a drop down menu labeled "Task Detail." The particular client and/or contract associated with the task is entered via a drop down menu associated with the entry area labeled "Client/Contract." Note that the drop down menu associated with the "Client/Contract" is limited to those clients and/or contracts the user is assigned.

Once the above mentioned information regarding the task are entered, the user also enters the total number of products processed but not completed during the time span previously entered in the window labeled "Qty PROC." Similarly, the user enters the total number of products processed and completed during the time span previously entered in the window labeled "Qty COMP." Note that the time span entered regarding regular hours and overtime hours only regards products not completed or completed and not a mixture thereof.

Should there be any extraordinary circumstances leading to productivity data that is not normal, such circumstances can be entered in the "Variance Comments" field.

After all information has been entered in the data entry screen 340, it is saved by clicking on the button "Add Entry." Cancellation of the data is accomplished by clicking on the "Cancel" button.

Figure 20:
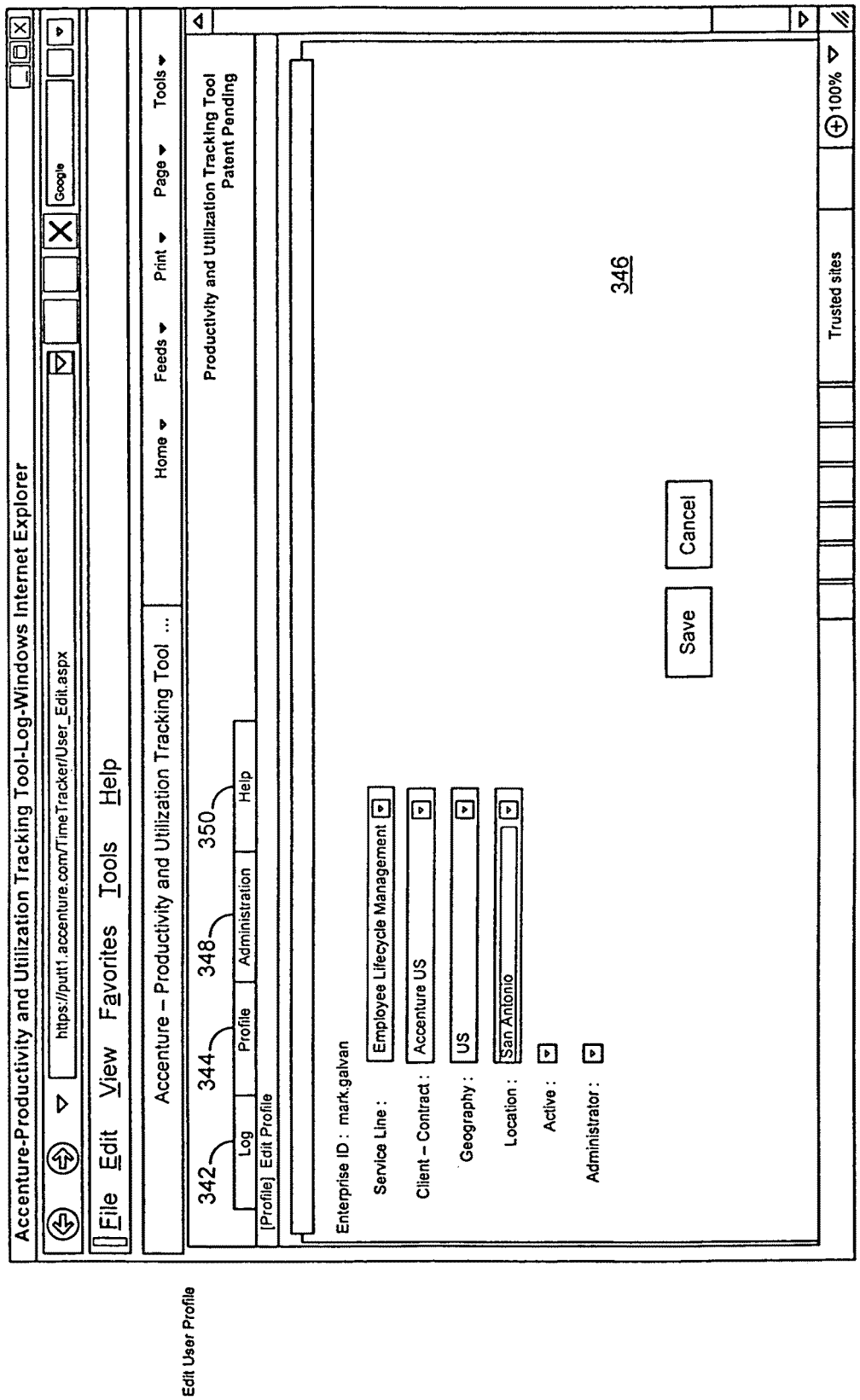
FIG. 20 shows an example of an edit profile user screen generated by the web-based individual productivity and utilization tracking system of FIGS. 17-18.

As mentioned above the drop down list for the "Client/Contract" entry area is dependent on the identity of the user and the clients and contract in which the user is responsible. Accordingly, it is necessary for the user to enter such information and keep it current. This is accomplished via clicking on the "Profile" tab 344 so that an "Edit User Profile" screen is shown on visual display 110 of FIG. 16. An example of an "Edit User Profile" screen 346 is shown in FIG. 20. As shown in FIG. 20, the user enters information regarding the country and city wherein he or she works. The user also indicates whether the user is active or an administrator. There are two entry areas that have corresponding drop down menus that list all available service lines and client/contracts which its employer is involved. The user selects those service lines and client/contracts in which the user spends a majority of his or her time. It is also possible to enter all service lines and client/contracts to which the user is involved. After all information has been entered in the "Edit User Profile" screen 340, it is saved by clicking on the button "Save." Cancellation of the data is accomplished by clicking on the "Cancel" button.

There are instances where the table lookup data needs to be edited. This can be done by clicking on the "Administration" tab 348. Once tab 348 is activated a drop down menu will appear with the subjects "Users," "Service Lines," "Clients/Contracts," "Task Categories," "Geographies," and "Locations." Clicking on the "Users" subject will result in a screen listing user names along with their associated service line and client/contract he or she is working on. Clicking on the "Service Lines" subject will result in a screen showing the names of the various service lines and whether or not the service line is a direct or indirect time process. Clicking on the "Client/Contract" subject results in a screen listing all clients/contracts and whether or not they are active or not. Clicking on the "Task Categories" subject results in a screen showing service lines and associated names for such service lines. Clicking on the "Geography" subject results on a screen listing various general geographical designations, such as country names, in which work may be performed for a client and a designation as to whether the geographical designation is currently active. Clicking on the location subject results in a listing of locations where work may be performed for a client and their associated geographical designation. In each of the above mentioned screens, the administrator is able to edit the information shown.

Should the user have any questions regarding the entry of information in the data entry screen 340, "Edit User Profile" screen 346, Administration screen, the "Help" tab 350. Activation of the "Help" tab results in a screen being displayed that asks the identity of the user and his or her password. Assuming the password entered is correct, then a web-based user friendly help page is displayed which allows the user to enter queries or key words that result in the display of information that can be used to answer his or her questions.

Once time has been entered by all users regarding tasks, it is possible to generate a number of Excel based reports in the form of pivot tables. FIG. 21 shows that pivot table reports are available in a number of dimension folders (see left hand screen), wherein a dimension is a category by which a report can be extracted. Definitions of the dimensions shown in the screen are given in FIGS. 21 and 22 as well.

Based on the above dimensions, a number of reports can be generated. Examples of such reports are shown in FIGS. 23A-I and will be summarized below. Such reports can be generated automatically or generated by a user selecting a desired report from a drop down menu of reports, for example. Note that the reports shown in FIGS. 23A-I are not exclusive. For example, reports generated by the systems 100 of FIGS. 1 and 16 can be generated by the web-based system of FIGS. 17A-18. Furthermore, the reports of FIGS. 23A-I can be generated in the systems 100 of FIGS. 1 and 16, in FIG. 23A, a basic table is shown wherein the hours worked by users (identified in "Enterprise id" column) during each day of a particular month. FIG. 23B, breaks down for each user the types of tasks worked (client funded direct/indirect and non-client funded), hours worked (regular and overtime) and quantities processed and completed.

FIG. 23C shows a monthly report showing how the hours worked and the quantities processed and completed are distributed by task category. FIG. 23D shows a particular service line broken down into tasks and how many hours are worked for various clients. FIG. 23E-F show monthly breakdown of hours worked by either all units (FIG. 23E) or a particular geographical unit (FIG. 23F) on various tasks associated with a client. FIG. 23G shows a daily utilization and productivity comparison broken down by clients/contracts. FIG. 23H shows a productivity comparison of geographical units along service lines. FIG. 23I shows an effort estimation by product.

In particular, FIG. 23I illustrates that there is an option for a daily or weekly or monthly view of several operational metrics for each product being produced: Quantity Completed, Actual Direct Hours Applied to Produce the Total Quantity Completed, The Rate of Production per Direct Hour of Applied Time, The Rate of Production per Total Time Applied (the sum of Direct and Indirect Time).

Based on the reports shown in FIGS. 23A-I in combination with other reports, management can take steps to improve the efficiencies of producing and delivering a product to clients.

The described embodiments are to be considered in all respects only as illustrative and not restrictive, and the scope of the invention is commensurate with the appended claims rather than the foregoing description.

I claim:

1. A productivity and utilization tracking system for an organization that includes individuals, the system comprising:
   an input device;
   a processor in communication with said input device;
   a memory in communication with said processor, wherein said memory comprises a database for each of said individuals of said organization that: 1) identifies each direct task worked on by each of said individuals during a session of work, 2) includes direct time applied to each of said identified direct tasks during said session of work, 3) includes a number of units for each of said identified direct tasks corresponding to each of said applied direct times, wherein each direct task, direct time and number of units is entered into said memory via said input device, and 4) identifies each direct task as a process step or a completion step within an overall process; and
   a visual display electrically connected to said processor;
   wherein said processor is configured to:
   count toward a number of completed units those units that were processed by the completion step within said overall process, and avoid counting those units that were processed only by process steps; and
   prepare a screen to be shown on said visual display, said screen containing productivity and/or utilization information for an individual with respect to said overall process based on said direct tasks, said direct times and said number of completed units associated with said individual that are present in said database.

2. The productivity and utilization tracking system of claim 1, wherein said processor prepares an advice screen that provides advice to said individual in which said screen contains said individual's productivity and/or utilization information.

3. The productivity and utilization tracking system of claim 1, wherein said input device is selected from the group consisting of a keyboard, a microphone, a touch screen and a mouse.

4. The productivity and utilization tracking system of claim 1, wherein said input device is in communication with said processor in a wireless manner.

5. The productivity and utilization tracking system of claim 1, wherein said input device is in communication with said processor via a hardwire connection.

6. The productivity and utilization tracking system of claim 1, wherein said direct time applied to each of said identified direct tasks during said session of work is identified as regular hours.

7. The productivity and utilization tracking system of claim 1, wherein said direct time applied to each of said identified direct tasks during said session of work is identified as overtime hours.

8. The productivity and utilization tracking system of claim 1, wherein said processor is able to distinguish processes and sub-processes from one another.

9. The productivity and utilization tracking system of claim 8, wherein said processor assigns attributes to each of said processes and sub-processes.

10. The productivity and utilization tracking system of claim 9, wherein said attributes are selected from the group consisting of: designating as a completion task, service line, process category, team, points, sub-team name, time category, action-type and label.

11. The productivity and utilization tracking system of claim 1, wherein said database identifies an indirect task that is unbillable and worked on by said individual during a session of work.

12. The productivity and utilization tracking system of claim 11, wherein said indirect task is selected from the group consisting of: breaks, CIO support, contractor time off, records task, meetings, metric reporting, productivity tracking, training personal development and training.

13. The productivity and utilization tracking system of claim 1, wherein said screen contains information regarding an actual rate of said units completed or processed by said individual.

14. The productivity and utilization tracking system of claim 13, said processor comparing said actual rate with an expected rate and based on said comparing said processor causes a visual indicator to be displayed on said screen that is representative of whether or not said actual rate differs from said expected rate by a predetermined amount.

15. The productivity and utilization tracking system of claim 13, said processor determining variance for said individual based on a factor selected from the group consisting of: percentage off a target and deviation from upper and lower limits and having said screen flag when said variance occurs.

16. The productivity and utilization tracking system of claim 13, wherein said processor prepares a second screen containing information regarding a cost of processing and completing units.

17. A method of tracking productivity and utilization information regarding an individual of an organization, the method comprising:
   entering via an input device task information regarding said individual into a database that: 1) identifies each direct task worked on by said individual during a session of work, 2) direct time applied to each of said identified direct tasks during said session of work, and 3) a number of units for each of said identified direct tasks corresponding to each of said applied direct times;
   identifying each direct task as a process step or a completion step within an overall process;
   counting toward a number of completed units those units that were processed by the completion step within said overall process, and avoiding counting those units that were processed only by process steps; and
   displaying on a visual display productivity and utilization information for said individual with respect to said overall process based on said direct tasks, said direct times and said number of completed units that are present in said database.

18. The method of claim 17, further comprising providing advice on said display to said individual regarding productivity and utilization of said individual based on said entered task information.

19. The method of claim 17, wherein said direct time applied to each of said identified direct tasks during said session of work is identified as regular hours.

20. The method of claim 17, wherein said direct time applied to each of said identified direct tasks during said session of work is identified as overtime hours.

21. The method of claim 17, further comprising distinguishing processes and sub-processes from one another.

22. The method of claim 21, further comprising assigning attributes to each of said processes and sub-processes.

23. The method of claim 22, wherein said attributes are selected from the group consisting of: designating as a completion task, service line, process category, team, points, sub-team name, time category, action-type and label.

24. The method of claim 17, further comprising identifying an indirect task that is unbillable and worked on by said individual during a session of work.

25. The method of claim 24, wherein said indirect task is selected from the group consisting of: breaks, CIO support, contractor time off, records task, meetings, metric reporting, productivity tracking, training personal development and training.

26. The method of claim 17, further comprising displaying information on said display regarding an actual rate of said units completed or processed by said individual.

27. The method of claim 26, further comprising comparing said actual rate with an expected rate and based on said comparing a visual indicator is displayed on said display that is representative of whether or not said actual rate differs from said expected rate by a predetermined amount.

28. The method of claim 26, further comprising determining variance for said individual based on a factor selected from the group consisting of: percentage off a target and deviation from upper and lower limits and having said screen flag when said variance occurs.

29. The method of claim 26, further comprising displaying on said display information regarding a cost of processing and completing units.

30. The productivity and utilization tracking system of claim 1, wherein the system further comprises:
   a presentation layer through which access is provided to an online form for entering the direct time;
   a business logic layer comprising business logic configured to generate said productivity and/or utilization information with respect to said overall process;
   a data access layer comprising a data access application configured to store said productivity and/or utilization information with respect to said overall process in a data layer in communication with said data access layer.

31. The method of claim 17, wherein said method further comprises:
   displaying on said visual a presentation layer through which access is provided to an online form for entering said direct time;
   using a business logic in a business logic layer to generate said productivity and/or utilization information for said individual with respect to said overall process;
   using a data access application in a data access layer to store said productivity and/or utilization information with respect to said overall process in a data layer in communication with said data access layer.

32. The productivity and utilization tracking system of claim 1, wherein said number of units is a quantity of discrete tasks performed or a quantity of discrete items produced.

33. The method of claim 17, wherein said number of units is a quantity of discrete tasks performed or a quantity of discrete items produced.

* * * * *